(12) United States Patent
Huh et al.

(10) Patent No.: US 10,293,675 B2
(45) Date of Patent: May 21, 2019

(54) POWERTRAIN FOR ECO-FRIENDLY VEHICLE

(71) Applicant: Hyundai Motor Company, Seoul (KR)

(72) Inventors: Jun Hoi Huh, Seoul (KR); Seong Eun Park, Gwangmyeong-si (KR); Kwang Min Choi, Seoul (KR); Tae Sic Park, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 574 days.

(21) Appl. No.: 14/958,529

(22) Filed: Dec. 3, 2015

(65) Prior Publication Data
US 2017/0021718 A1 Jan. 26, 2017

(30) Foreign Application Priority Data
Jul. 20, 2015 (KR) .................. 10-2015-0102449

(51) Int. Cl.
*B60K 6/48* (2007.10)
*B60K 6/442* (2007.10)
(Continued)

(52) U.S. Cl.
CPC .............. *B60K 6/547* (2013.01); *B60K 6/442* (2013.01); *B60K 6/50* (2013.01); *B60K 6/52* (2013.01); *B60Y 2200/92* (2013.01); *B60Y 2300/182* (2013.01); *B60Y 2400/70* (2013.01); *B60Y 2400/82* (2013.01); *Y02T 10/6234* (2013.01); *Y10S 903/916* (2013.01); *Y10S 903/951* (2013.01)

(58) Field of Classification Search
CPC .................. B60K 6/442; B60K 2006/4808
USPC ................................................ 74/661
See application file for complete search history.

(56) References Cited

U.S. PATENT DOCUMENTS 8,869,653 B2 * 10/2014 Fujita .................. B60K 6/26
74/331
9,133,911 B2 * 9/2015 Kwon .................. F16H 3/093
(Continued)

FOREIGN PATENT DOCUMENTS

JP 2002-114048 A 4/2002
JP 2005-297786 A 10/2005
(Continued)

*Primary Examiner* — Ha Dinh Ho
(74) *Attorney, Agent, or Firm* — Morgan Lewis & Bockius LLP

(57) ABSTRACT

A powertrain for a vehicle includes an engine, a first motor serving as a motor for driving of a vehicle or serving as a generator, a first power transmission mechanism disposed between the engine and the first motor to transmit the power of the engine to the first motor or to cut off transmission of power between the engine and the first motor, a second power transmission mechanism disposed between the first motor and a driving shaft of running wheels to transmit the power of the first motor to the driving shaft of the running wheels or to cut off transmission of power between the first motor and the driving shaft of the running wheels, and a second motor connected to the second power transmission mechanism via a third power transmission mechanism to transmit power to the second power transmission mechanism and outputting power for driving the vehicle and transmit the power to the driving shaft of the running wheels.

12 Claims, 19 Drawing Sheets

(51) Int. Cl.
*B60K 6/547* (2007.10)
*B60K 6/52* (2007.10)
*B60K 6/50* (2007.10)

(56) References Cited

U.S. PATENT DOCUMENTS

| | | | | |
|---|---|---|---|---|
| 9,764,631 | B2* | 9/2017 | Kim | B60K 6/442 |
| 2010/0032218 | A1* | 2/2010 | Ideshio | B60W 10/10 |
| | | | | 180/65.225 |
| 2013/0345019 | A1* | 12/2013 | Kaltenbach | B60K 6/387 |
| | | | | 477/5 |

FOREIGN PATENT DOCUMENTS

| | | |
|---|---|---|
| JP | 2005-329841 A | 12/2005 |
| JP | 2007-290677 A | 11/2007 |
| JP | 2010-111317 A | 5/2010 |
| JP | 2011-093494 A | 5/2011 |
| KR | 10-1459474 B1 | 11/2014 |
| KR | 10-1459490 B1 | 11/2014 |
| KR | 10-2015-0020405 A | 2/2015 |
| KR | 10-2015-0059702 A | 6/2015 |

* cited by examiner

-- Related Art --

POWERTRAIN FOR ECO-FRIENDLY VEHICLE

CROSS-REFERENCE TO RELATED APPLICATION

This application claims under 35 U.S.C. § 119(a) the benefit of priority to Korean Patent Application No. 10-2015-0102449 filed on Jul. 20, 2015, the entire content of which is incorporated herein by reference.

TECHNICAL FIELD

The present disclosure relates to a powertrain for an eco-friendly vehicle. More particularly, the present disclosure relates to a novel powertrain for an eco-friendly vehicle which constitutes a range extender electric vehicle (EV) system including two motors and an engine such that power of the two motors are concurrently used as a running power for the vehicle.

BACKGROUND

A range extender electric vehicle (EV) technology has been developed as one of the technologies applicable to eco-friendly vehicles such as electric vehicles. In the range extender electric vehicle technology, a first motor for an engine and a generator is mounted on the vehicle in addition to a second motor for the vehicle. Therefore, when a state of charge (SOC) of a battery falls below a threshold level, an engine output drives the first motor which is for a generator to charge the battery while the vehicle runs by the second motor (running in a series mode), thereby increasing a running distance of the vehicle.

A conventional range extender EV technology will now be briefly described with reference to FIG. 20.

Charge Depletion (CD) Mode

In a charge depletion mode in which a second motor MG2 drives a vehicle while consuming the electric power of the battery, only the second motor MG2 drives the vehicle, while the first motor MG1 for an engine and a generator does not operate.

When a required power for the second motor MG2 for driving the vehicle is, for example, set to 125 kW, the second motor MG2 for driving the vehicle produces an output of 125 kW.

Charge Sustaining (CS) Mode

When the SOC of the battery falls below a threshold level while driving using the second motor MG2, the first motor MG1 for an engine and a generator is driven by the output of the engine, and the second motor MG2 for driving the vehicle exerts an output of 20 kW while the first motor MG1 generates electric power and charges the battery. Consequently, the second motor MG2 cannot contribute to driving of the vehicle using the remaining power of about 100 kW (that is, the remaining power of about 100 kW is not employed).

As a result, in the conventional range extender EV technology, excessive power for the second motor are applied, thereby increasing manufacturing costs.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a powertrain for an eco-friendly vehicle having a range extender EV system which includes two motors and an engine such that an output of a first motor for electrical generation in addition to an output of a second motor for driving the vehicle are transmitted to running wheels while driving in a charge depletion mode to employ the outputs of the two motors as a power for driving the vehicle, thereby ensuring an output of the vehicle and reducing the required power for the second motor.

According to an exemplary embodiment, a powertrain for an eco-friendly vehicle includes an engine, a first motor for operating as a motor for driving a vehicle or for operating as a driving source for a generator using the power of the engine transmitted thereto, a first power transmission mechanism disposed between the engine and the first motor so as to transmit the power of the engine to the first motor or to cut off transmission of power between the engine and the first motor, a second power transmission mechanism disposed between the first motor and a driving shaft of running wheels so as to transmit the power of the first motor to the driving shaft of the running wheels or to cut off the transmission of power between the first motor and the driving shaft of the running wheels, and a second motor connected to the second power transmission mechanism via a third power transmission mechanism to transmit power to the second power transmission mechanism, and outputting power for driving the vehicle and transmits the power to the driving shaft of the running wheels through the third power transmission mechanism and the second power transmission mechanism.

According to another exemplary embodiment, a powertrain for an eco-friendly vehicle includes an engine, a first motor operating as a motor for driving a vehicle, a first power transmission mechanism disposed between the engine and the first motor so as to transmit the power of the engine to the first motor or to cut off transmission of power between the engine and the first motor, a second power transmission mechanism disposed between the first motor and a driving shaft of first running wheels to transmit the power of the first motor to the driving shaft of the first running wheels or to engage or disengage transmission of power between the first motor and the driving shaft of the first running wheels, and a second motor connected to second running wheels to transmit power to the second running wheels.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
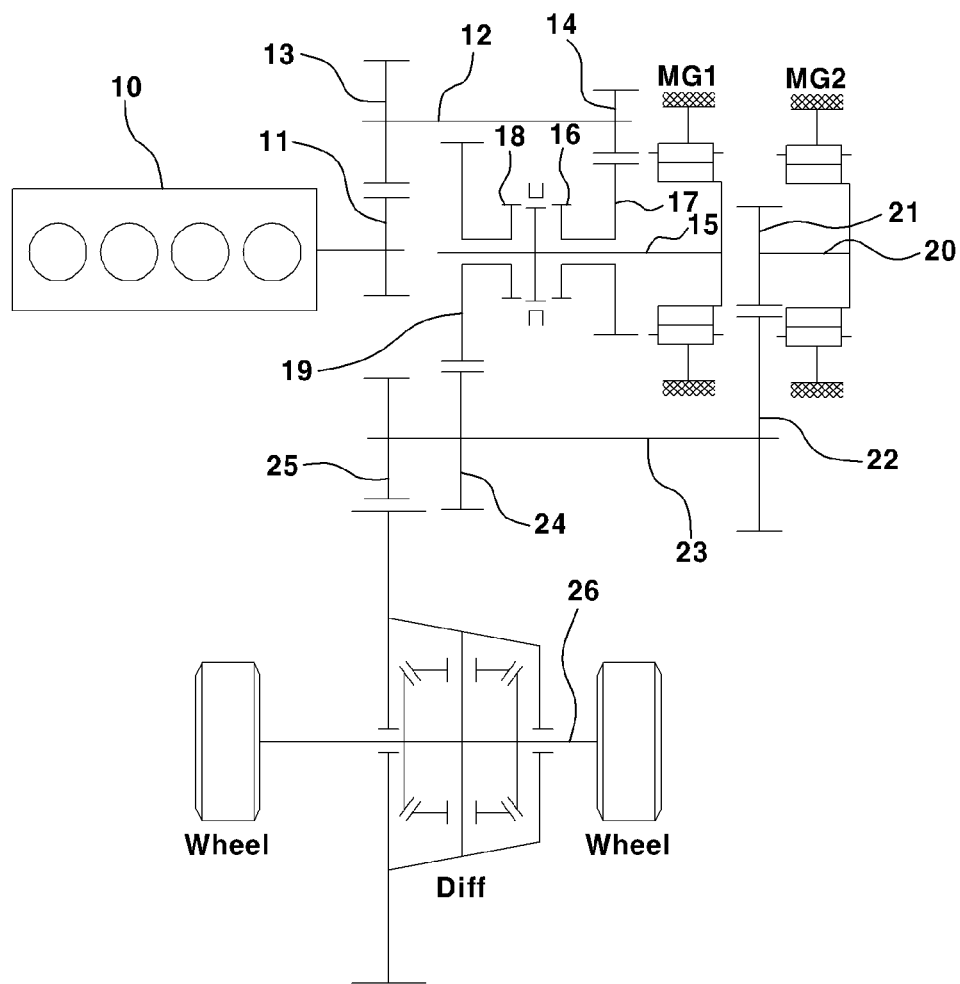
FIG. 1 is a power transmission system diagram showing a powertrain for an eco-friendly vehicle according to a first embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, exemplary embodiments will be described in detail with reference to the attached drawings so as to enable the embodiments to be easily understood by one of ordinary skill in the art to which this invention belongs.

First Embodiment

FIG. 1 is a power transmission system diagram showing a powertrain for an eco-friendly vehicle according to a first embodiment.

The first embodiment provides a powertrain including an engine 10 and two motors, that is, a first motor MG1 and a second motor MG2. The engine 10 provides only power for the generation of electrical power required for charging a battery (not shown), which is the energy storage device for the vehicle.

The first motor MG1 is driven as a generator using power transmitted from the engine so as to charge a battery (charging by motor), or operates as a vehicular driving source to supplement the output of the second motor MG2 (driving as motor).

The second motor MG2 is the motor for driving a vehicle, that is, for outputting power required for running the vehicle, and the power output from the second motor MG2 is ultimately transmitted to running wheels.

According to the first embodiment, the engine 10 is connected to the first motor MG1 so as to transmit its power to the first motor MG1. The second motor MG2 is connected to the path, along which the power of the first motor MG1 is applied to the running wheels, so as to transmit its power to the path.

A first power transmission mechanism is disposed between the engine 10 and the first motor MG1 so as to transmit the power of the engine 10 to the first motor MG1. Upon the operation of the first power transmission mechanism, power of the first power transmission mechanism is transmitted to a first motor MG1.

The first power transmission mechanism includes: an engine gear 11 coupled to the output shaft of the engine 10; a first intermediate gear 13 coupled to a first power transmission shaft 12 and engaged with the engine gear 11; a second intermediate gear 14 coupled to the first power transmission shaft 12 as being coaxial with the first intermediate gear 13; and a first synchronizer 16 connected to the rotating shaft 15 of the first motor MG1. A first motor power transmission gear 17 is connected to the rotating shaft 15 of the first motor MG1 via the first synchronizer 16 so as to selectively engage or disengage the transmission of power between the first motor power transmission gear 17 and the rotating shaft 15 of the first motor MG1 through the first synchronizer 16. The first motor power transmission gear 17 is engaged with the second intermediate gear 14.

The first motor power transmission gear 17, which is coupled to the rotating shaft 15 of the first motor MG1 in an idling manner, is integrated with the rotating shaft 15 of the first motor MG1, thereby enabling transmission of power therebetween when the first synchronizer 16 is closed.

When the first synchronizer 16 is closed, the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1, thereby driving for electrical generation by the first motor MG1.

The first synchronizer 16, which synchronizes the rotating shaft 15 of the first motor MG1 with the first motor power transmission gear 17, engages or disengages the transmission of power between the rotating shaft 15 of the first motor MG1 and the first motor power transmission gear 17. The first synchronizer 16 may include a general clutch.

Since the first synchronizer 16 and all of the synchronizers applied to the embodiments are well-known configurations, which engage or disengage transmission of power between components disposed at both ends thereof or synchronizes the components at both ends with each other so as to enable the transmission of power therebetween upon closing of the synchronizers, a detailed description thereof is omitted.

In the powertrain according to the present disclosure, closing and opening of the respective synchronizers is controlled in response to control signals from a control unit of a vehicle, for example, a transmission control unit (TCU).

A second power transmission mechanism is disposed between the first motor MG1 and the rotating shaft 26 of the running wheels so as to transmit the power of the first motor MG1 to the driving shaft 26 of the running wheels. Upon operation of the second power transmission mechanism, the power of the first motor MG1 is transmitted to the running wheels.

The second power transmission mechanism includes: a second synchronizer 18 connected to the rotating shaft 15 of the first motor MG1; a first output gear 19 connected to the rotating shaft 15 of the first motor MG1 via the second synchronizer 18 so as to selectively engage or disengage the transmission of power between the first output gear 19 and the rotating shaft 15 of the first motor MG1 through the second synchronizer 18; a second output gear 24 coupled to a second power transmission shaft 23 and engaged with the first output gear 19; and a third output gear 25 coupled to the second power transmission shaft 23 in the state of being coaxial with the second output gear 24 and connected to the driving shaft 26 of the running wheels so as to enable the transmission of power to the driving shaft 26 of the running wheels.

The second synchronizer 18, which synchronizes the rotating shaft 15 of the first motor MG1 with the first output gear 19, selectively engages or disengages the transmission of power between the rotating shaft 15 of the first motor MG1 and the first output gear 19, and may include a general clutch.

The first output gear 19 is coupled to the rotating shaft 15 of the first motor MG1 in the idling manner. Upon closing of the second synchronizer 18, the rotating shaft 15 of the first motor MG1 is integrated with the first output gear 19, thereby enabling the transmission of power therebetween.

When the second synchronizer 18 is closed, the power of the first motor MG1 is transmitted to the driving shaft 26 of the running wheels through the rotating shaft 15 of the first motor MG1, the second synchronizer 18, the first output gear 19, the second output gear 24, the second power transmission shaft 23 and the third output gear 25.

The power transmitted from the first motor MG1 may be used as an auxiliary power required for driving the vehicle. That is, the power may supplement the power transmitted to the driving shaft 26 of the running wheels from the second motor MG2 to assist the driving of the vehicle.

According to the first embodiment, the rotating shaft 20 of the second motor MG2 is connected to the second power transmission mechanism via a third power transmission mechanism so as to transmit power to the second power transmission mechanism such that the rotating shaft 20 of the second motor MG2 transmits power to the running wheels, either in cooperation with or independently of the first motor MG1.

The third power transmission mechanism includes: a first transmission gear 21 coupled to the rotating shaft 20 of the second motor MG2; and a second transmission gear 22 coupled to the second power transmission shaft 23 of the second power transmission mechanism and engaged with the first transmission gear 21. The second transmission gear 22 is further connected to the third output gear 25 of the second power transmission mechanism in the state of being coaxial with the third output gear 25.

Accordingly, the power of the second motor MG2 is transmitted to the driving shaft 26 of the running wheels through the rotating shaft 20, the first transmission gear 21, the second transmission gear 22, the second power transmission shaft 23 and the third output gear 25.

The power transmitted from the second motor MG2 is used as a running power required for driving the vehicle.

In summary, the powertrain according to the first embodiment includes three parallel shafts, that is, the first power transmission shaft 12, the rotating shaft 15 of the first motor MG1 and the second power transmission shaft 23, and further includes two synchronizers to engage or disengage the transmission of power, that are, the first synchronizer 16 and the second synchronizer 18.

The first synchronizer 16 serves as an engine clutch adapted to engage or disengage the transmission of power between the engine 10 and the first motor MG1. The second synchronizer 18 engages or disengages the transmission of power to the running wheels from the first motor MG1 such that the power of the first motor MG1 and the power of the second motor MG2 are concurrently used as the running power for the vehicle (the power required for driving the vehicle).

In the double motor driving mode, the second power transmission shaft 23 serves as a final power transmission shaft which receives both the power of the first motor MG1 and the power of the second motor MG2 and transmits the combined force to the driving shaft 26 of the running wheels through the third output gear 25.

The running wheels may be either front or rear pair of wheels. The first embodiment shown in FIG. 1 illustrates a two wheel drive (2WD) construction, which employs the running wheels (front wheels or rear wheels) as the driving wheels.

Operational states and flows of power transmission in various operational modes of the powertrain according to the first embodiment, which is constructed as described above, will now be described.

First Charge Depletion Mode

Figure 2:
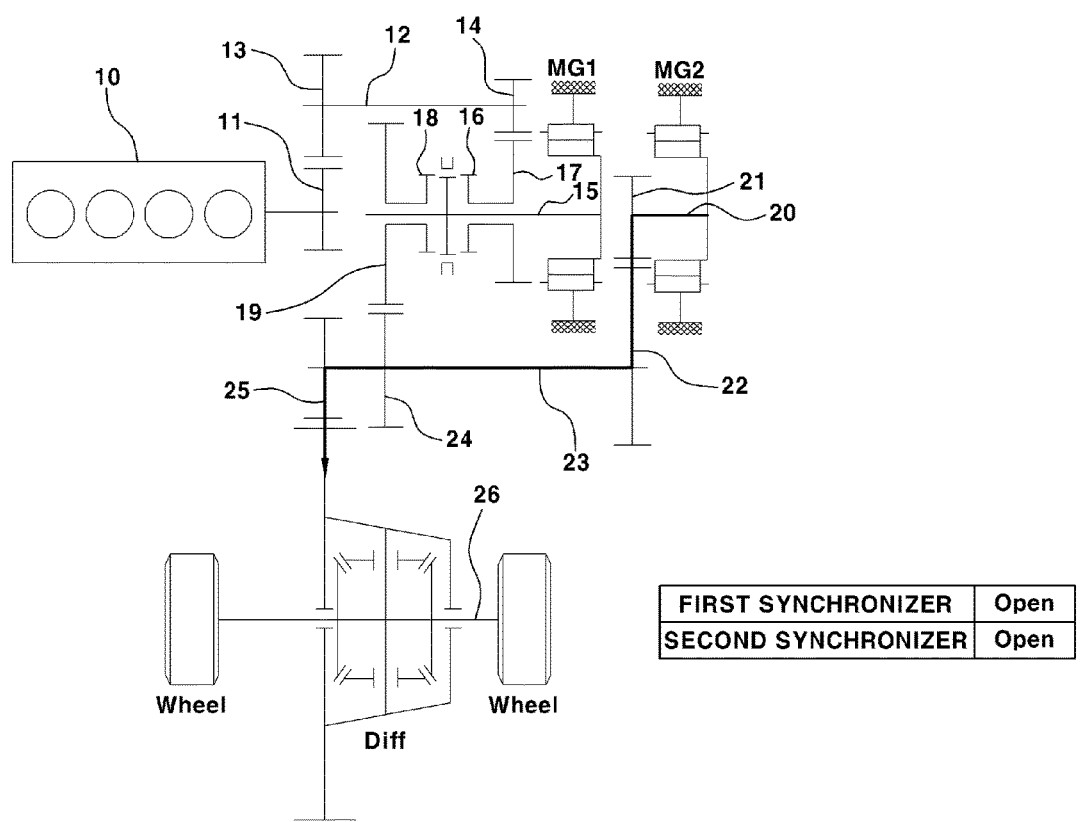
FIG. 2 illustrates the flow of power transmission in a first charge depletion (1st CD) mode of the powertrain according to the first embodiment.

FIG. 2 illustrates a flow of power transmission in a first charge depletion (1st CD) mode of the powertrain according to the first embodiment.

The first charge depletion mode is an electric vehicle (EV) running mode in which the second motor MG2, which is the driving motor of the vehicle, operates by consuming the battery power. Thus, the vehicle runs by the power of the second motor MG2 when the SOC of the battery is at a reference value or higher. Here, the vehicle runs by operation only of the second motor MG2 without operation of the engine 10 and the first motor MG1 for electrical generation (single motor driving).

Accordingly, in the first charge depletion mode, only the power of the second motor MG2 is transmitted to the driving shaft 26 of the running wheels through the third power transmission mechanism, the second power transmission shaft 23 of the second power transmission mechanism and the third output gear 25 of the second power transmission mechanism without the transmission of power through the first power transmission mechanism and the second power transmission mechanism.

In the first charge depletion mode, both synchronizers 16 and 18 are opened, that is, both the first synchronizer 16 of the first power transmission mechanism and the second synchronizer 18 of the second power transmission mechanism are opened. Accordingly, the transmission of power between the engine 10 and the first motor MG1 is disengaged, and the transmission of power between the rotating shaft 15 of the first motor MG1 and the second power transmission shaft 23 is disengaged. Only the power of the second motor MG2 is transmitted to the driving shaft 26 of the running wheels through the third power transmission mechanism, the second power transmission shaft 23 of the second power transmission mechanism, and the third output gear 25 of the second power transmission mechanism.

Here, the power of the second motor MG2 is ultimately transmitted to the driving shaft 26 of the running wheels through the rotating shaft 20, the first transmission gear 21, the second transmission gear 22, the second power transmission shaft 23, and the third output gear 25.

Second Charge Depletion Mode

Figure 3:
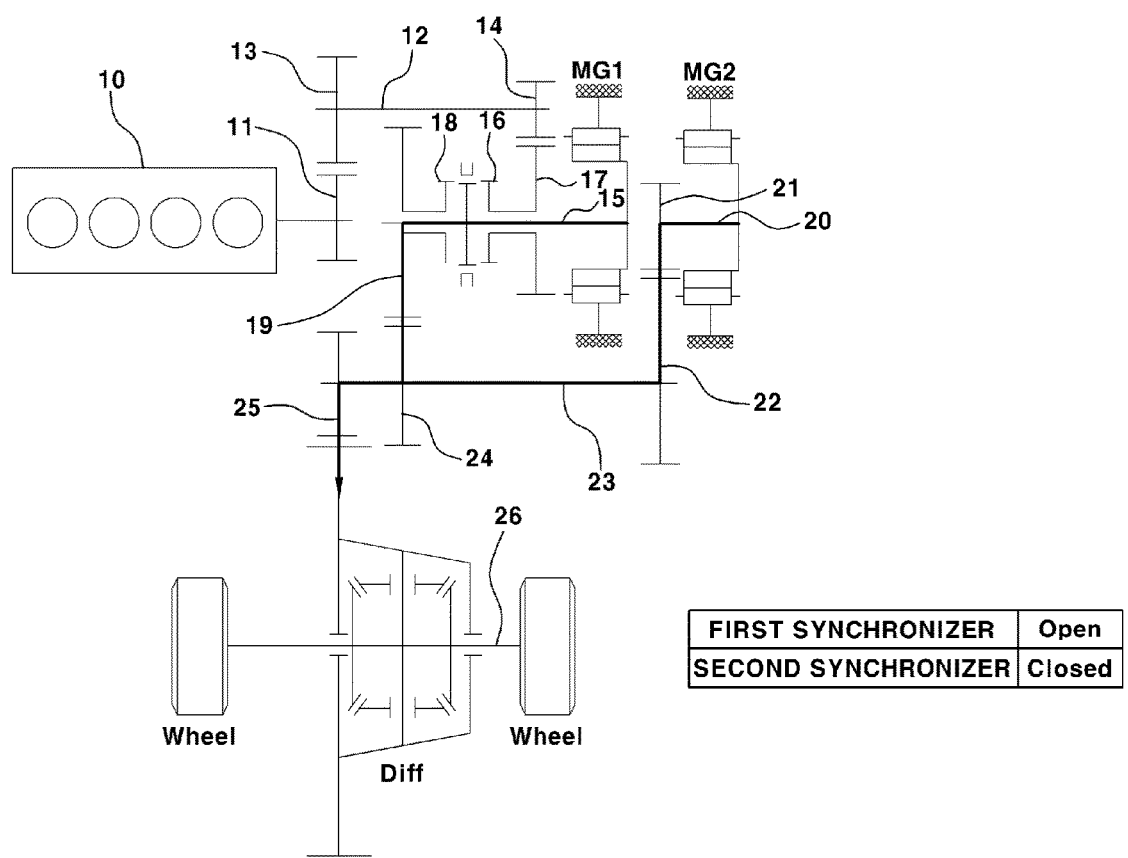
FIG. 3 illustrates the flow of power transmission in a second charge depletion (2nd CD) mode of the powertrain according to the first embodiment.

FIG. 3 illustrates a flow of power transmission in a second charge depletion (2nd CD) mode of the powertrain according to the first embodiment.

The second charge depletion mode is an electric vehicle (EV) running mode in which the second motor MG2, which is the main driving motor of a vehicle, and the first motor MG1, which is the auxiliary driving motor, operate by consuming the power of the battery. Thus, the vehicle runs by the power of the second motor MG2 and the first motor MG1 when the SOC of the battery is at a reference value (which is equal to or different from the reference value in the first charge depletion mode) or higher. Here, the vehicle runs by the transmission of the power of the second motor MG2 to the running wheels and the transmission of the power of the first motor MG1 to the running wheels without the operation of the engine 10 (double motor driving).

Accordingly, in the second charge depletion mode, the power of the second motor MG2 is transmitted to the driving shaft 26 of the running wheels through the third power transmission mechanism and the second power transmission mechanism (the second power transmission shaft and the third output gear) while the power of the first motor MG1 is transmitted to the driving shaft 26 of the running wheels through the second power transmission mechanism under the condition that the transmission of power through the first power transmission mechanism is blocked while the transmission of power through the second power transmission mechanism is allowed.

More specifically, the second charge depletion mode is implemented in such a manner that the power of the second motor MG2 is transmitted to the driving shaft 26 of the running wheels through the third power transmission mechanism and the power of the first motor MG1 is transmitted to the driving shaft 26 of the running wheels through the second power transmission mechanism by closing the second synchronizer 18 of the second power transmission mechanism.

The power of the second motor MG2 is ultimately transmitted to the driving shaft 26 of the running wheels through the rotating shaft 20, the first transmission gear 21, the second transmission gear 22, the second power transmission shaft 23 and the third output gear 25.

At the same time, the power of the first motor MG1 is transmitted to the driving shaft 26 of the running wheels through the rotating shaft 15, the second synchronizer 18, the first output gear 19, the second output gear 24, the second power transmission shaft 23 and the third output gear 25 by closing the second synchronizer 18.

In the second charge depletion mode, the first synchronizer 16 of the first power transmission mechanism is controlled to be opened.

Figure 19:
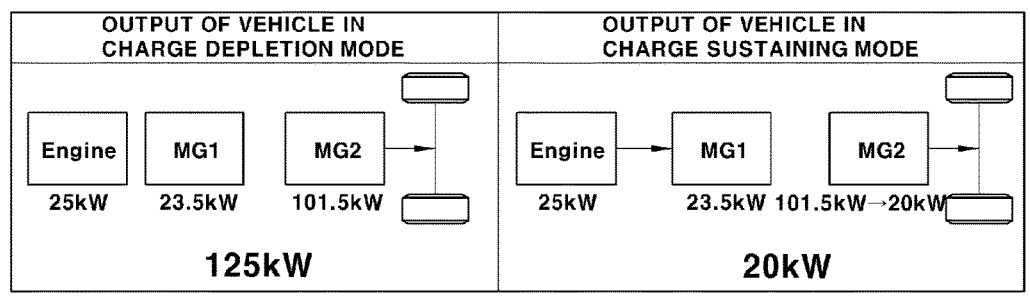
FIG. 19 is a conceptual diagram illustrating that required power for the second motor can be reduced according to a powertrain for an eco-friendly vehicle according to the present disclosure.
Figure 20:
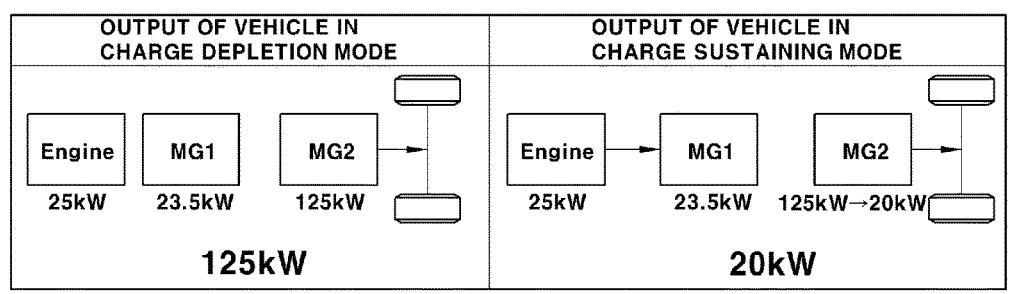
FIG. 20 is a conceptual diagram illustrating a conventional range extender EV technology.

In the second charge depletion mode according to the first embodiment, the output (23.5 kW) of the first motor MG1 is added to the output (101.5 kW) of the second motor MG2, thus producing the total output of 125 kW, as shown in FIG. 19.

Therefore, even if the required power for the second motor MG2 is changed to 101.5 kW from 125 kW, it is possible to ensure the total output of 125 kW by power assistance from the first motor MG1, and it is possible to lower manufacturing costs by reducing the required power for the second motor MG2.

Charge Sustaining Mode

Figure 4:
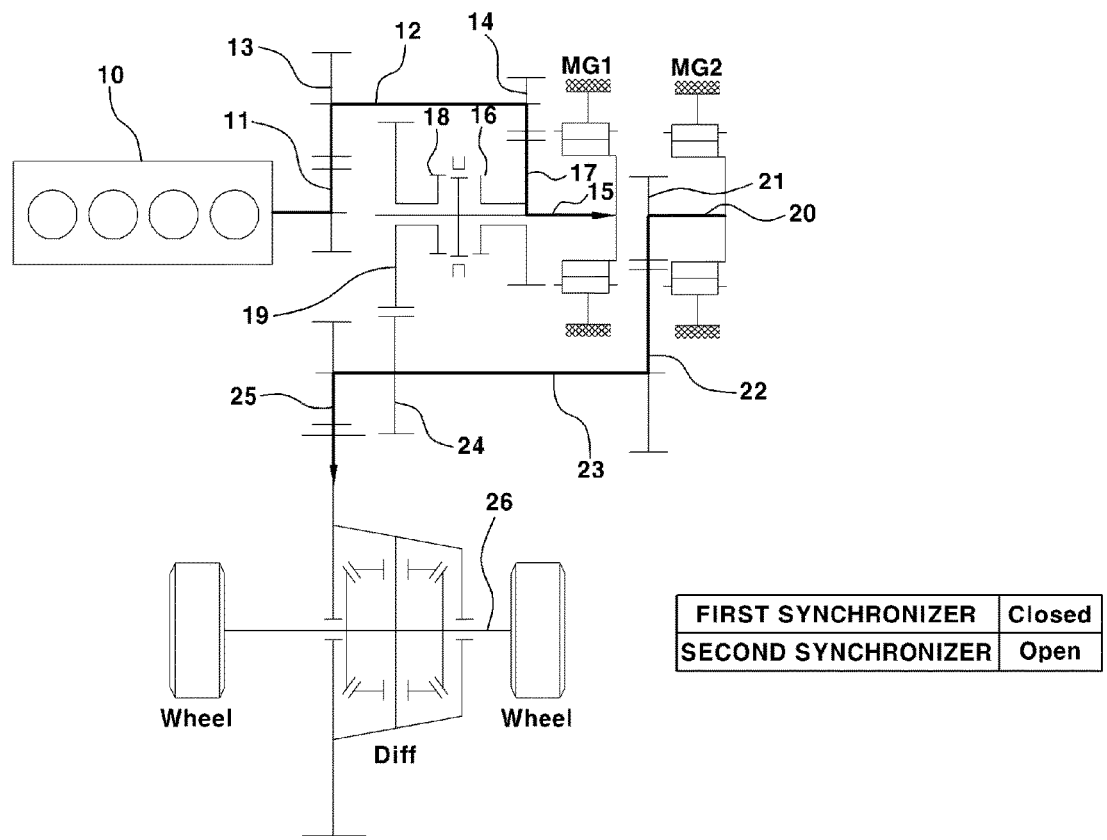
FIG. 4 illustrates the flow of power transmission in a charge sustaining (CS) mode of the powertrain according to the first embodiment.

FIG. 4 illustrates a flow of power transmission in a charge sustaining (CS) mode of the powertrain according to the first embodiment.

The charge sustaining mode is a series running mode in which, when the SOC of the battery falls below the reference value while the second motor MG2 serves as the main driving motor of the vehicle, the first motor MG1 operates as a driving source of the generator by the power of the engine 10 and the second motor MG2 operates by the electric power of the battery which is accumulated by the first motor MG1, thereby producing a desired output (for example, 20 kW).

Accordingly, in the charge sustaining mode, the power of the second motor MG2 is transmitted to the driving shaft 26 of the running wheels through the third power transmission mechanism, the second power transmission shaft 23 and the third output gear 25 while the power of the engine 10 is transmitted to the first motor MG1 through the first power transmission mechanism under the condition that the transmission of power through the first power transmission mechanism is allowed while the transmission of power through the second power transmission mechanism is blocked, thereby operating the first motor MG1 as a driving source of the generator.

More specifically, the power of the second motor MG2 is transmitted to the driving shaft 26 of the running wheels through the third power transmission mechanism, and the transmission of power between the first motor MG1 and the second power transmission shaft 23 is disengaged by opening the second synchronizer 18 of the second power transmission mechanism.

At the same time, the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1 by closing the first synchronizer 16 of the first power transmission mechanism, thereby operating the first motor MG1 as the driving source of a generator.

When the SOC of the battery falls below the predetermined value, the first motor MG1 operates by the power of the engine 10, thereby charging the battery. At this time, the output of the second motor MG2 is controlled to be decreased.

In the charge sustaining mode of the powertrain according to the first embodiment of the present invention, the output of the second motor MG2 is decreased (for example, to 20 kW) and is applied to the running wheels, as shown in FIG. 19. Accordingly, even if the required power for the second motor MG2 is decreased to 101.5 kW from 125 kW, there is no problem at all in producing an output of 20 kW. Therefore, the second motor MG2 having a lowered power can be applied, and manufacturing costs can be reduced by virtue of the reduced power for the second motor MG2.

Second Embodiment

Figure 5:
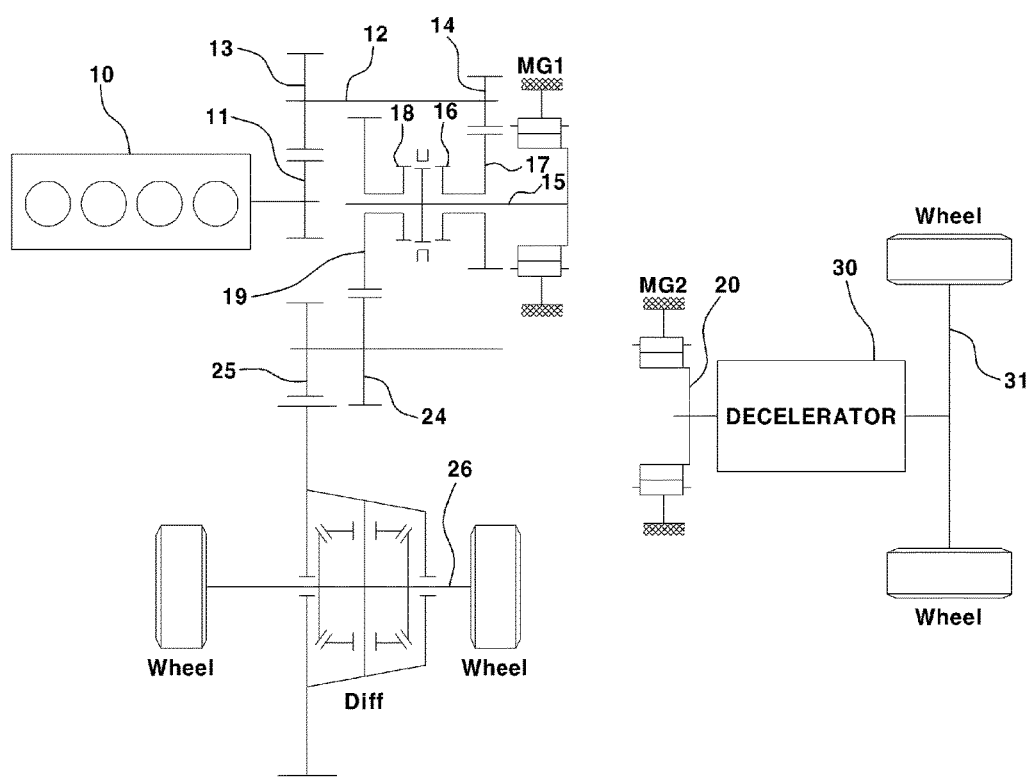
FIG. 5 is a power transmission system diagram showing a powertrain for an eco-friendly vehicle according to a second embodiment.

FIG. 5 is a power transmission system diagram showing a powertrain for an eco-friendly vehicle according to a second embodiment of the present invention.

Unlike the first embodiment, which is the powertrain for a 2WD vehicle, the second embodiment is a powertrain for a four-wheel-drive (4WD) vehicle.

In a second charge depletion mode, when the power of the first motor MG1, which is a running power required for driving a vehicle, is transmitted to the driving shaft 26, if the running wheels which are driven by the power of the first motor MG1 are the rear wheels, the power of the second motor MG2 is transmitted to the front wheels through a decelerator 30, and accordingly all of the front wheels and the rear wheels can be used as driving wheels.

In certain embodiments, the running wheels to which the power of the first motor MG1 is transmitted may be the front wheels, and the running wheels to which the power of the second motor MG2 is transmitted may be the rear wheels.

In the 4WD operation, the rotating shaft 20 of the second motor MG2 is connected to the driving shaft 31 of the running wheels through the decelerator 30, as shown in FIG. 5.

Referring to FIG. 5, the second motor MG2 is not connected to the engine 10 and the first motor MG1, but is connected to the driving shaft 31 corresponding to the other running wheels so as to transmit power to the driving shaft 31.

The second embodiment also employs the second motor MG2 as the main driving source for running a vehicle. Accordingly, in the first charge depletion mode, the second motor MG2 operates, and the power of the second motor MG2 is transmitted to the driving shaft 31 of the running wheels through the decelerator 30, thereby driving the vehicle.

As shown in FIG. 5, there is no difference between the first embodiment and the second embodiment except that the second motor MG2 is connected to the other running wheels to which the first motor MG1 is not connected so as to transmit power. The third power transmission mechanism, which includes the first transmission gear 21 and the second transmission gear 22, is excluded because the rotating shaft 20 of the second motor MG2 is not connected to the second power transmission shaft 23 in a power transmittable manner.

That is, the engine 10 is connected to the first motor MG1 so as to transmit the power required only to charge the battery (not shown).

The first motor MG1 is driven as a generator using power transmitted from the engine (charging by motor), or operates as a vehicular driving source to supplement the output of the second motor MG2 (driving as motor).

The first power transmission mechanism for transmitting the power of the engine 10 to the first motor MG1 is disposed between the engine 10 and the first motor MG1. By the operation of the first power transmission mechanism, the power of the engine 10 is transmitted to the first motor MG1.

The first power transmission mechanism includes: an engine gear 11 coupled to the engine 10; a first intermediate gear 13 coupled to a first power transmission shaft 12 and engaged with the engine gear 11; a second intermediate gear 14 coupled to the first power transmission shaft 12 which is coaxial with the first intermediate gear 13; and a first synchronizer 16 connected to the rotating shaft 15 of the first motor MG1. A first motor power transmission gear 17 is connected to the rotating shaft 15 of the first motor MG1 via the first synchronizer 16 such that the transmission of power between the rotating shaft 15 of the first motor MG1 and the first motor power transmission gear 17 is selectively engaged or disengaged by the first synchronizer 16. The first motor power transmission gear 17 is engaged with the second intermediate gear 14.

The first motor power transmission gear 17 is coupled to the rotating shaft 15 of the first motor MG1 in an idling manner. Upon closing of the first synchronizer 16, the rotating shaft 15 of the first motor MG1 is integrated with the first motor power transmission gear 17, thereby enabling the transmission of power therebetween.

Upon closing of the first synchronizer 16, the power of the engine 10 is transmitted to the first motor MG1 through the engine gear 11, the first intermediate gear 13, the first power transmission shaft 12, the second intermediate gear 14, the first motor power transmission gear 17, the first synchronizer 16, and the rotating shaft 15 of the first motor MG1, thereby operating the first motor MG1 as a driving source for electrical generation.

The first synchronizer 16, which synchronizes the rotating shaft 15 of the first motor MG1 with the first motor power transmission gear 17, selectively engages or disengages the transmission of power between the rotating shaft 15 of the first motor MG1 and the first motor power transmission gear 17, and may include a general Clutch.

The second power transmission mechanism for transmitting the power of the first motor MG1 to the driving shaft 26 of the running wheels is disposed between the first motor MG1 and the driving shaft 26 of the running wheels. By the operation of the second power transmission mechanism, the power of the first motor MG1 is transmitted to the running wheels.

The second power transmission mechanism includes: a second synchronizer 18 connected to the rotating shaft 15 of the first motor MG1; a first output gear 19 connected to the rotating shaft 15 of the first motor MG1 via the second synchronizer 18 such that the transmission of power between the first output gear 19 and the rotating shaft 15 of the first motor MG1 is selectively engaged or disengaged by the second synchronizer 18; a second output gear 24 coupled to the second power transmission shaft 23 and engaged with the first output gear 19; and a third output gear 25 coupled to the second power transmission shaft 23 to be coaxial with the second output gear 24 and connected to the driving shaft 26 of the running wheels so as to transmit the power to the driving shaft 26 of the running wheels.

The second synchronizer 18, which synchronizes the rotating shaft 15 of the first motor MG1 with the first output gear 19, selectively engages or disengages the transmission of power between the rotating shaft 15 of the first motor MG1 and the first output gear 19, and may include a general clutch.

The first output gear 19 is coupled to the rotating shaft 15 of the first motor MG1 in the idling manner. Upon closing of the second synchronizer 18, the rotating shaft 15 of the first motor MG1 is integrated with the first output gear 19, thereby enabling the transmission of power therebetween.

When the second synchronizer 18 is closed, the power of the first motor MG1 is transmitted to the driving shaft 26 of the running wheels through the rotating shaft 15 of the first motor MG1, the second synchronizer 18, the first output gear 19, the second output gear 24, the second power transmission shaft 23, and the third output gear 25.

The power, which is transmitted from the first motor MG1 in this way, may be used as auxiliary power required for running the vehicle. That is, the power may supplement the power transmitted to the driving shaft 31 of the other running wheels, which are not connected to the driving shaft 26, through the decelerator 30 from the second motor MG2 to assist in driving the vehicle. The power of the second motor MG2 is used as the main power required for driving the vehicle.

The operational states and flows of power transmission in various operational modes of the powertrain according to the second embodiment, which is constructed as describe above, will now be described.

First Charge Depletion Mode

With the exception that the power of the second motor MG2 is transmitted to the driving shaft 31 of the running wheels through the decelerator 30, there is no difference between the first embodiment and the second embodiment in operational states, other components, or flows of power transmission.

The first charge depletion mode is an electric vehicle (EV) running mode in which the second motor MG2, which is the driving motor of a vehicle, operates by consuming battery power. Thus, the vehicle runs by the power of second motor MG2 when the SOC of the battery is at a reference value or higher and in which the vehicle runs by operation of only the second motor MG2 without operation of the engine 10 and operation of the first motor MG1 for electrical generation (single motor driving).

Accordingly, the first charge depletion mode is implemented in such a manner that only the power of the second motor MG2 is ultimately transmitted to the driving shaft 31 of the running wheels through the decelerator 30 without the transmission of power through the first power transmission mechanism and the second power transmission mechanism.

In the first charge depletion mode, both synchronizers 16 and 18 are opened, that is, both the first synchronizer 16 of the first power transmission mechanism and the second synchronizer 18 of the second power transmission mechanism are opened. Accordingly, the transmission of power between the engine 10 and the first motor MG1 is disengaged, and the transmission of power between the rotating shaft 15 of the first motor MG1 and the second power transmission shaft 23 is disengaged. Only the power of the second motor MG2 is transmitted to the driving shaft 31 of the running wheels through the decelerator 30.

Second Charge Depletion Mode

The power of the second motor MG2 is transmitted to the driving shaft 31 of the running wheels through the decelerator 30, however, there is no difference between the first embodiment and the second embodiment in operational states, other components, or flows of power transmission.

The second charge depletion mode is an electric vehicle (EV) running mode in which the second motor MG2, which is the main driving motor of a vehicle, and the first motor MG1, which is the auxiliary driving motor, operate by consuming the power of the battery. Thus, the vehicle runs by the power of the second motor MG2 and the first motor MG1 when the SOC of the battery is at a reference value (which is equal to or different from the reference value in the first charge depletion mode) or higher and in which the vehicle runs by the transmission of the power of the second motor MG2 to the running wheels and the transmission of the power of the first motor MG1 to the running wheels without the operation of the engine 10 (double motor driving).

Since both the power of the first motor MG1 and the power of the second motor MG2 are transmitted to the rear wheels and the front wheels, respectively, 4WD operation, in which both the rear and front wheels are driven, is implemented.

Accordingly, in the second charge depletion mode, the power of the second motor MG2 is transmitted to the driving shaft 31 of the running wheels through the decelerator 30 while the power of the first motor MG1 is transmitted to the driving shaft 26 of the running wheels through the second power transmission mechanism under the condition that the transmission of power through the first power transmission mechanism is blocked while the transmission of power through the second power transmission mechanism is allowed.

More specifically, the second charge depletion mode is implemented in such a manner that the power of the second motor MG2 is transmitted to the driving shaft 31 of the running wheels through the accelerator 30. The power of the first motor MG1 is transmitted to the driving shaft 26 of the running wheels through the second power transmission mechanism by closing the second synchronizer 18 of the second power transmission mechanism.

Here, the power of the first motor MG1 is transmitted to the driving shaft 26 of the running wheels through the rotating shaft 15, the second synchronizer 18, the first output gear 19, the second output gear 24, the second power transmission shaft 23, and the third output gear 25 by closing the second synchronizer 18.

In the second charge depletion mode, the first synchronizer 16 of the first power transmission mechanism is controlled to be opened.

Charge Sustaining Mode

The power of the second motor MG2 is transmitted to the driving shaft 31 of the running wheels through the decelerator 30, however, there is no difference between the first embodiment and the second embodiment in operational states, other components or flows of power transmission.

The charge sustaining mode is a series running mode in which, when the SOC of the battery falls below the reference value while the second motor MG2 serves as the main driving motor of the vehicle, the first motor MG1 operates as a driving source of the generator by the power of the engine 10 and the second motor MG2 operates by the electric power of the battery which is accumulated by the first motor MG1, thereby producing a desired output (for example, 20 kW).

Accordingly, in the charge sustaining mode, the power of the second motor MG2 is transmitted to the driving shaft 31 of the running wheels through the decelerator 30 while the power of the engine 10 is transmitted to the first motor MG1 through the first power transmission mechanism under the condition that the transmission of power through the first power transmission mechanism is allowed while the transmission of power through the second power transmission mechanism is blocked, thereby operating the first motor MG1 as the driving source of the generator.

That is, the power of the second motor MG2 is transmitted to the driving shaft 31 of the running wheels through the decelerator 30, and the power transmission between the first motor MG1 and the second power transmission shaft 23 is disengaged by opening the second synchronizer 18 of the second power transmission mechanism.

At the same time, the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1 by closing the first synchronizer 16 of the first power transmission mechanism, thereby causing the first motor MG1 to operate as the driving source of a generator.

When the SOC of the battery falls below the predetermined value, the first motor MG1 operates by the power of the engine 10, thereby charging the battery. At this time, the output of the second motor MG2 is decreased.

Third Embodiment

Figure 6:
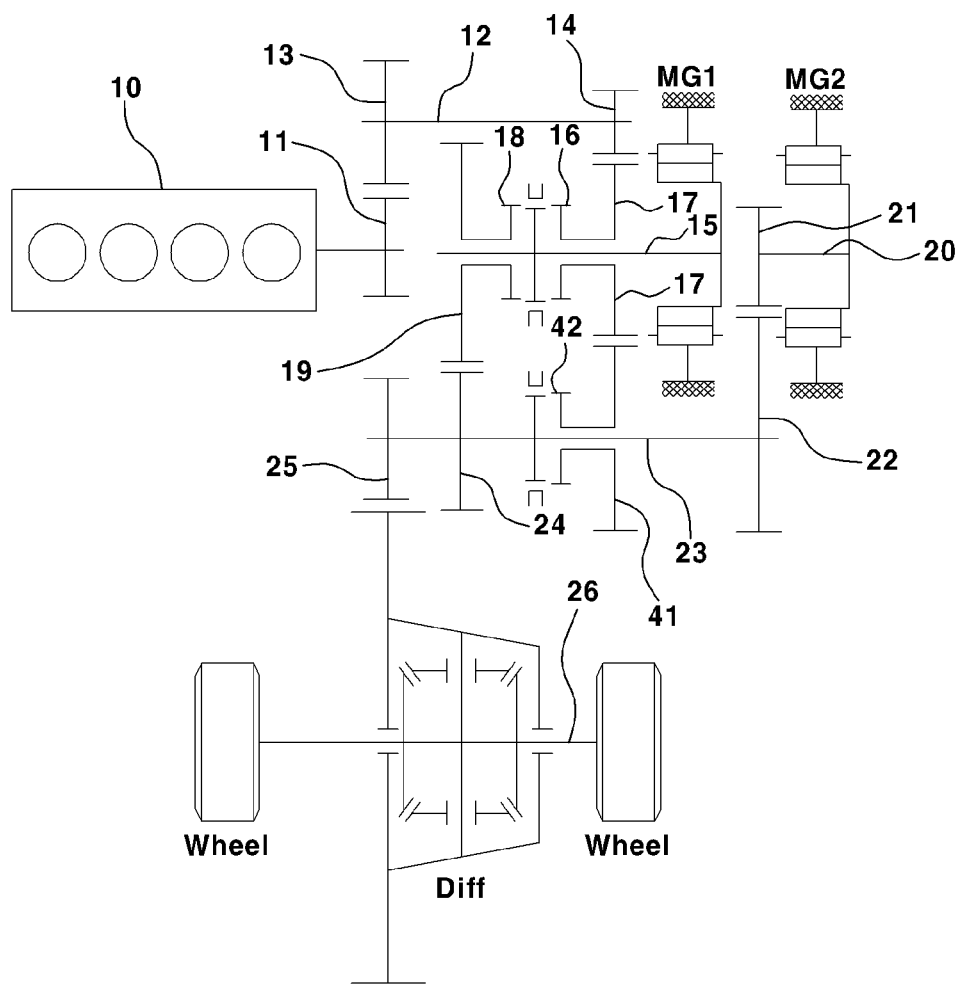
FIG. 6 is a power transmission system diagram showing a powertrain for an eco-friendly vehicle according to a third embodiment.

FIG. 6 is a power transmission system diagram showing a powertrain for an eco-friendly vehicle according to a third embodiment.

The third embodiment provides a powertrain including an engine 10 and two motors, that is, a first motor MG1 and a second motor MG2. The engine 10 provides power only for the generation of electrical power required for charging a battery (not shown), which is the energy storage device for the vehicle, or supplements the output of the second motor MG2 so as to serve as a driving source for running the vehicle.

In the third embodiment, the power of the engine 10 may supplement the power of the second motor MG2. Here, the power of the engine 10 is divided into the power for electrical generation and the power required for driving the running wheels, and is used for both the electrical generation and the running of the vehicle.

The first motor MG1 is driven as a generator using the power transmitted from the engine so as to charge a battery (charging by motor), or operates as a vehicular driving source to supplement the output of the second motor MG2 (driving as motor).

The second motor MG2 is the motor serving as a main driving source for driving the vehicle, that is, for outputting the power required for driving the vehicle, and the power output from the second motor MG2 is ultimately transmitted to the running wheels.

The powertrain according to the third embodiment further includes a fourth power transmission mechanism, which is disposed between the first power transmission mechanism and the second power transmission mechanism so as to selectively transmit the remaining power divided from the engine 10 (not the power for electrical generation) to the second power transmission mechanism, which is connected to the running wheels from the first power transmission mechanism.

The fourth power transmission mechanism includes a third synchronizer 42 selectively transmitting the power divided from the engine 10 (not the power for electrical generation) some of the power of the engine 10 for driving the vehicle, which is separated from the remaining power of the engine 10 for electrical generation, to the second power transmission shaft 23 of the second power transmission mechanism from the first power transmission mechanism. The third synchronizer 42 is connected to the second power transmission shaft 23. The fourth power transmission mechanism further includes a fourth output gear 41 connected to the second power transmission shaft 23 via the third synchronizer 42 such that the transmission of power between the fourth output gear 41 and the second power transmission shaft 23 is selectively engaged or disengaged by the third synchronizer 42. The fourth output gear 41 is engaged with the first motor power transmission gear 17.

The fourth output gear 41 is coupled to the second power transmission shaft 23 in an idling manner. When the third synchronizer 42 is closed, the fourth output gear 41 is integrated with the second power transmission shaft 23, thereby allowing the transmission of power therethrough.

When the first synchronizer 16 and the third synchronizer 42 are closed, the power divided from the engine 10 (not the power for electrical generation), which is transmitted to the first motor MG1 through the first power transmission mechanism, is ultimately transmitted to the driving shaft 26 of the running wheels through the first motor power transmission gear 17, the fourth output gear 41, the third synchronizer 42, the second power transmission shaft 23 and the third output gear 25.

Except the further provision of the fourth power transmission mechanism, the other constructions are equal to those of the first embodiment. That is, the third embodiment further includes the fourth power transmission mechanism in addition to the construction of the first embodiment.

Specifically, the engine 10 is connected to the first motor MG1 to transmit the power to the first motor MG1, and the second motor MG2 is connected to the path, through which the power of the first motor MG1 is applied to the running wheels, to transmit the power to the running wheels.

The first power transmission mechanism is disposed between the engine 10 and the first motor MG1 so as to transmit the power of the engine 10 to the first motor MG1. Upon the operation of the first power transmission mechanism, the power of the engine 10 is transmitted to the first motor MG1.

The first power transmission mechanism includes an engine gear 11 coupled to the output shaft of the engine 10; a first intermediate gear 13 is coupled to a first power transmission shaft 12 and engaged with the engine gear 11; a second intermediate gear 14 coupled to the first power transmission shaft 12 coaxial with the first intermediate gear 13; and a first synchronizer 16 connected to the rotating shaft 15 of the first motor MG1. A first motor power transmission gear 17 is connected to the rotating shaft 15 of the first motor MG1 via the first synchronizer 16 such that the transmission of power between the first motor power transmission gear 17 and the rotating shaft 15 of the first motor MG1 is selectively engaged or disengaged by the first synchronizer 16. The first motor power transmission gear 17 is engaged with the second intermediate gear 14.

The first motor power transmission gear 17 is coupled to the rotating shaft 15 of the first motor MG1 in the idling manner. Upon closing of the first synchronizer 16, the rotating shaft 15 of the first motor MG1 is integrated with the first motor power transmission gear 17, thereby enabling the transmission of power therebetween.

Upon closing of the first synchronizer 16, the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1, thereby operating the first motor MG1 as a driving source for electrical generation.

The first synchronizer 16, which synchronizes the rotating shaft 15 of the first motor MG1 with the first motor power transmission gear 17, selectively engages or disengages the transmission of power between the rotating shaft 15 of the first motor MG1 and the first motor power transmission gear 17, and may include a general clutch.

The second power transmission mechanism for transmitting the power of the first motor MG1 to the driving shaft 26 of the running wheels is disposed between the first motor MG1 and the driving shaft 26 of the running wheels. By the operation of the second power transmission mechanism, the power of the first motor MG1 is transmitted to the running wheels.

The second power transmission mechanism includes: a second synchronizer 18 connected to the rotating shaft 15 of the first motor MG1; and a first output gear 19 connected to the rotating shaft 15 of the first motor MG1 via the second synchronizer 18 such that the transmission of power between the first output gear 19 and the rotating shaft 15 of the first motor MG1 is selectively engaged or disengaged by the second synchronizer 18. A second output gear 24 is coupled to the second power transmission shaft 23 and engaged with the first output gear 19. A third output gear 25 is coupled to the second power transmission shaft 23, which is coaxial with the second output gear 24, and connected to the driving shaft 26 of the running wheels so as to transmit the power to the driving shaft 26 of the running wheels.

The second synchronizer 18, which synchronizes the rotating shaft 15 of the first motor MG1 with the first output gear 19, selectively engages or disengages the transmission of power between the rotating shaft 15 of the first motor MG1 and the first output gear 19, and may include a general clutch.

The first output gear 19 is coupled to the rotating shaft 15 of the first motor MG1 in the idling manner. Upon closing of the second synchronizer 18, the rotating shaft 15 of the first motor MG1 is integrated with the first output gear 19, thereby enabling the transmission of power therebetween.

When the second synchronizer 18 is closed, the power of the first motor MG1 is transmitted to the driving shaft 26 of the running wheels through the rotating shaft 15 of the first motor MG1, the second synchronizer 18, the first output gear 19, the second output gear 24, the second power transmission shaft 23, and the third output gear 25.

The power transmitted from the first motor MG1 may be used as auxiliary power required for running the vehicle. That is, the power may supplement the power transmitted to the driving shaft 26 of the running wheels from the second motor MG2 so as to assist in driving the vehicle.

According to the third embodiment, the rotating shaft 20 of the second motor MG2 is connected to the second power transmission mechanism via the third power transmission mechanism so as to transmit the power to the second power transmission mechanism such that the second motor MG2 transmits the power to the running wheels, either in conjunction with or independently of the first motor MG1.

The third power transmission mechanism includes a first transmission gear 21 coupled to the rotating shaft 20 of the second motor MG2 and a second transmission gear 22, which is coupled to the second power transmission shaft 23 of the second power transmission mechanism so as to engage with the first transmission gear 21. The first transmission gear 21 is coaxially connected to the third output gear 25 of the second power transmission mechanism.

Accordingly, the power of the second motor MG2 is ultimately transmitted to the driving shaft 26 of the running wheels through the rotating shaft 20, the first transmission gear 21, the second transmission gear 22, the second power transmission shaft 23, and the third output gear 25.

The power of the second motor MG2, which is transmitted in this way, is used as the running power required for driving the vehicle.

In summary, the third embodiment includes three parallel shafts, namely, the first power transmission shaft 12, the rotating shaft 15 of the first motor MG1 and the second power transmission shaft 23, and further includes a total of three synchronizers for engaging or disengaging the transmission of power, that are, the first synchronizer 16, the second synchronizer 18, and the third synchronizer 42.

The first synchronizer 16 serves as an engine clutch adapted to engage or disengage the transmission of power between the engine 10 and the first motor MG1. The second synchronizer 18 serves to engage or disengage the transmission of power to the running wheels from the first motor MG1 such that the double motor driving is performed, that is, the power of the first motor MG1 and the power of the second motor MG2 are concurrently used as the running power for the vehicle (the power required for driving the vehicle).

In the double motor driving mode, the second power transmission shaft 23 serves as a final power transmission shaft and receives both the power of the first motor MG1 and the power of the second motor MG2 and transmits the combined force to the driving shaft 26 of the running wheels through the third output gear 25.

The third synchronizer 42 engages or disengages the transmission of the remaining power which is divided from the engine 10 (not the power for electrical generation transmitted to the first motor MG1) and transmitted to the running wheels.

Due to the further provision of the third synchronizer 42, parallel mode operation may be implemented in such a way that some of the power of the engine 10 supplements the output of the second motor MG2. Thus, some of the power of the engine 10 and the power of the second motor MG2 are used together to drive the vehicle.

The running wheels may be one pair of wheels selected from among the front wheels and the rear wheels. The third embodiment in FIG. 6 illustrates a two-wheel-drive (2WD) construction in which all of the power of the engine, the power of the first motor MG1 and the power of the second motor MG2 are transmitted to the running wheels (front wheels or rear wheels) and the running wheels are used as the driving wheels.

In the powertrain according to the third embodiment, the vehicle can run in one of the first charge depletion mode, the second charge depletion mode, the charge sustaining mode, and the parallel mode.

Figure 7:
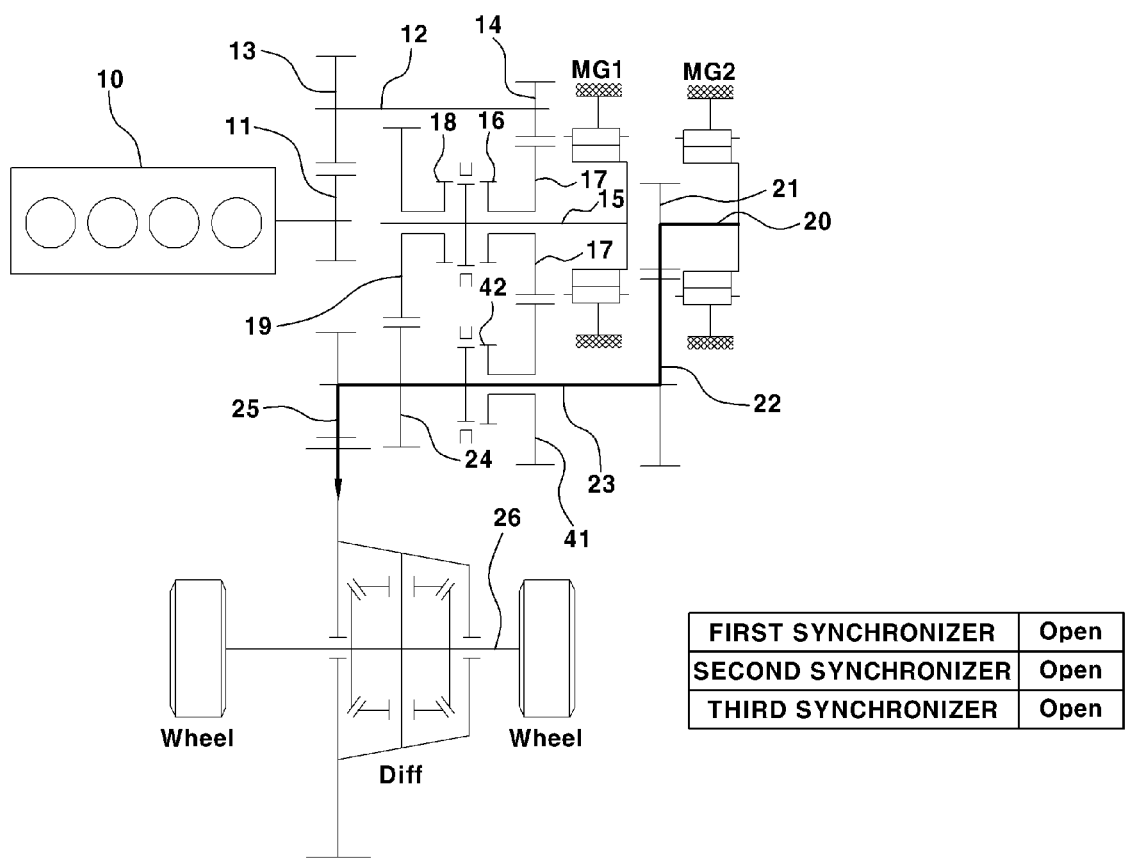
FIG. 7 illustrates the flow of power transmission in a first charge depletion (1st CD) mode of the powertrain according to the third embodiment.
Figure 8:
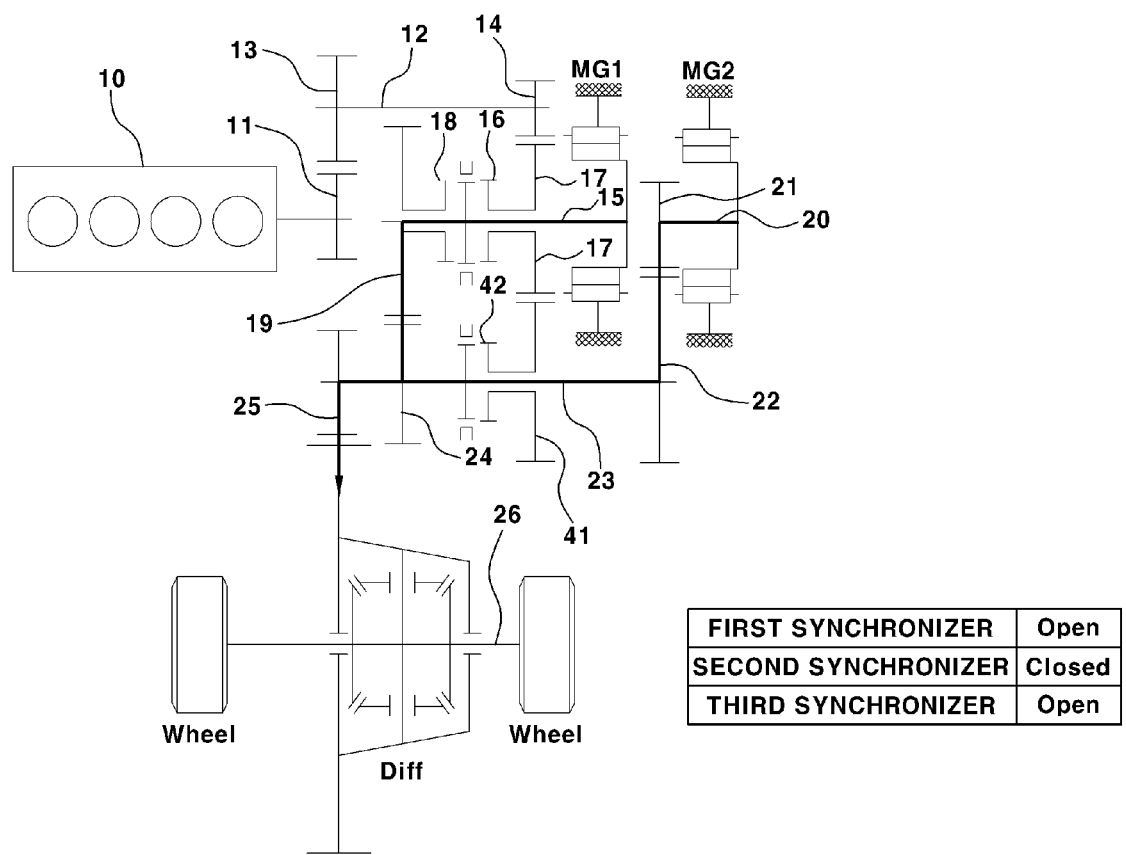
FIG. 8 illustrates the flow of power transmission in a second charge depletion (2nd CD) mode of the powertrain according to the third embodiment.
Figure 9:
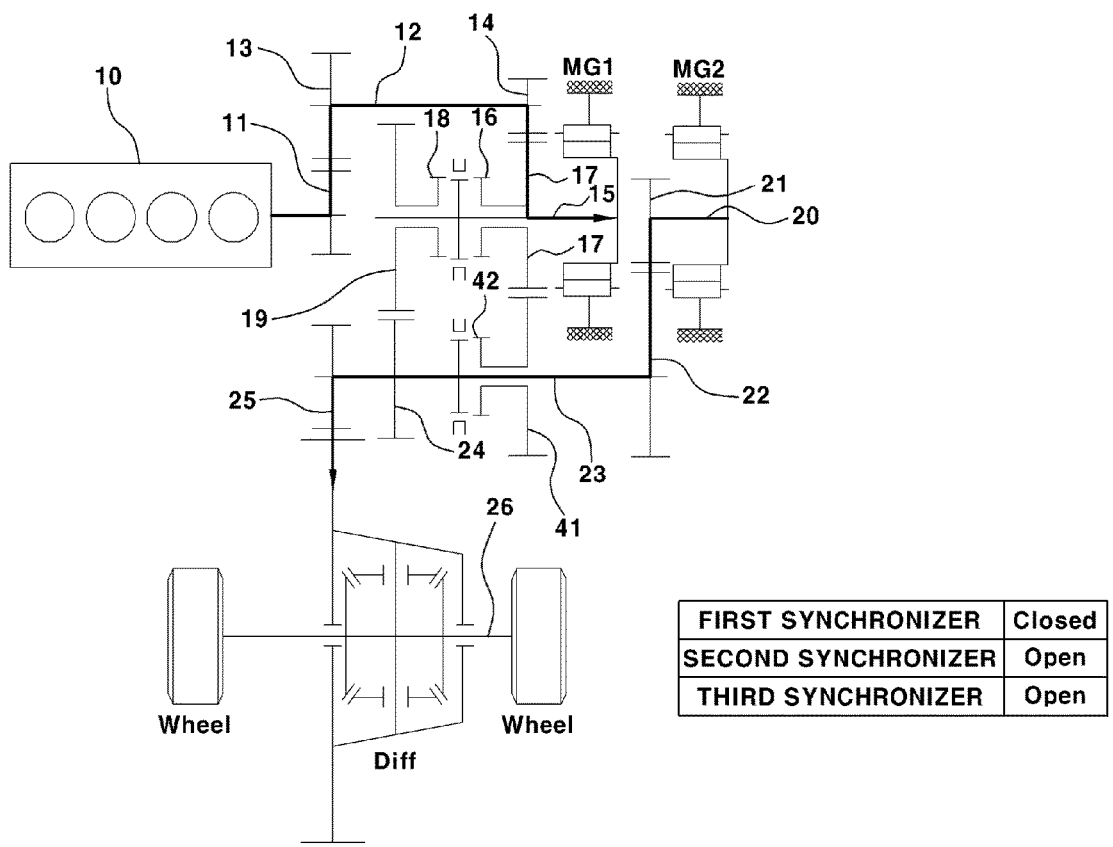
FIG. 9 illustrates the flow of power transmission in a charge sustaining (CS) mode of the powertrain according to the third embodiment.

Among these modes, since the first charge depletion mode, the second charge depletion mode, and the charge sustaining mode do not have features that distinguish them from the first embodiment in terms of the operational states of the components and the flows of power transmission, as shown in FIGS. 7 to 9, a detailed description thereof is omitted.

The operational states and flows of power transmission in the parallel mode, which are additionally realized by the provision of the fourth power transmission mechanism, will now be described.

Parallel Mode

Figure 10:
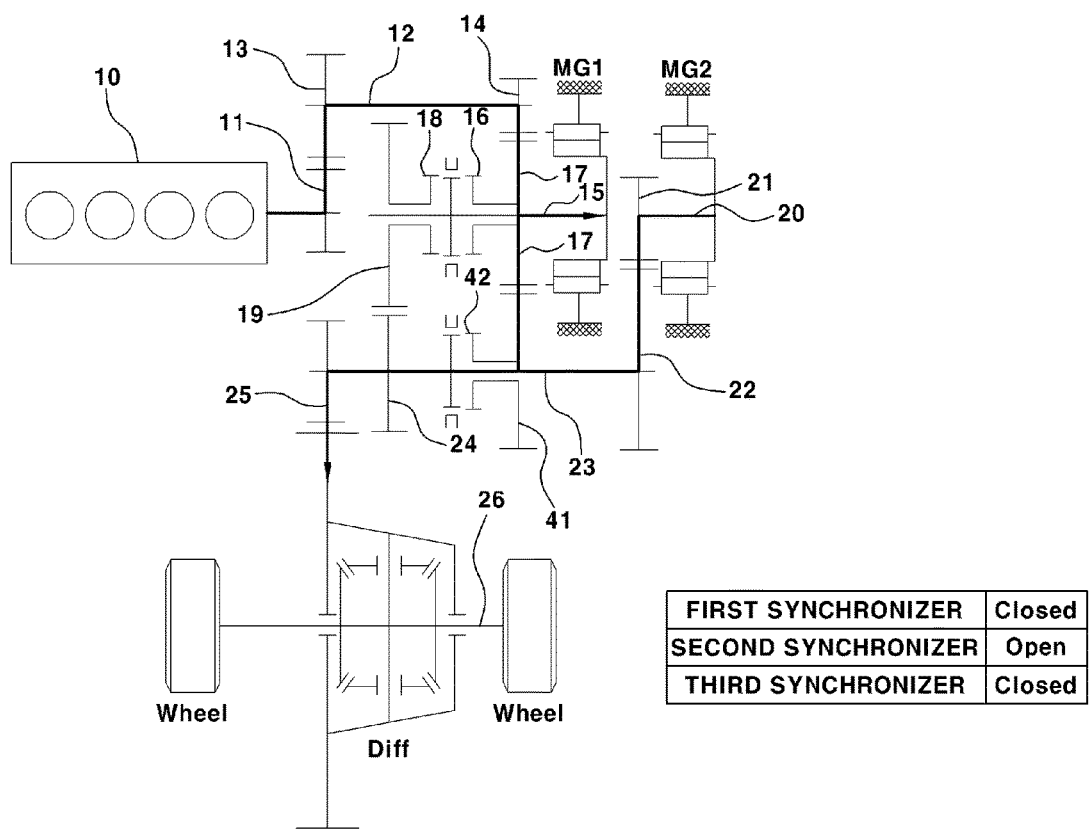
FIG. 10 shows the flow of power transmission in a parallel mode of the powertrain according to the third embodiment.

FIG. 10 shows a flow of power transmission in a parallel mode of the powertrain according to the third embodiment.

The parallel mode is a running mode of the vehicle in which some of the power of the engine 10 supplements the output of the second motor MG2 such that both some of the power of the engine 10 and the power of the second motor MG2 are used to drive the vehicle.

In the parallel mode, the power of the engine 10 is divided into the power for electrical generation and the power for driving the running wheels so as to be used both in the electrical generation and the driving of the vehicle. Here, the first motor MG1 operates as a driving source for the generator using the divided power of the engine 10 to charge the battery.

Here, the power of the second motor MG2 is transmitted to the driving shaft 26 of the running wheels through the third power transmission mechanism and the second power transmission shaft 23 of the second power transmission mechanism.

At this time, the power of the second motor MG2 is transmitted to the driving shaft 26 of the running wheels through the rotating shaft 20, the first transmission gear 21, the second transmission gear 22, the second power transmission shaft 23 and the third output gear 25.

Some of the power of the engine 10 is transmitted to the first motor MG1 so as to be used as the power for electrical generation, and the remaining power of the engine 10 is transmitted to the driving shaft 26 of the running wheels through the fourth power transmission mechanism and the second power transmission shaft 23 of the second power transmission mechanism so as to be used as an auxiliary power for driving the vehicle. The first synchronizer 16 and the third synchronizer 42 are controlled to be closed whereas the second synchronizer 18 is controlled to be opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1, and is then used in the electrical generation by the first motor MG1.

While the third synchronizer 42 is closed, the remaining power divided from the engine 10 (not the power transmitted to the first motor MG1 for electrical generation) is ultimately transmitted to the driving shaft 26 of the running wheels through the first motor power transmission gear 17, the fourth output gear 41, the third synchronizer 42, the second power transmission shaft 23 and the third output gear 25.

Fourth Embodiment

Figure 11:
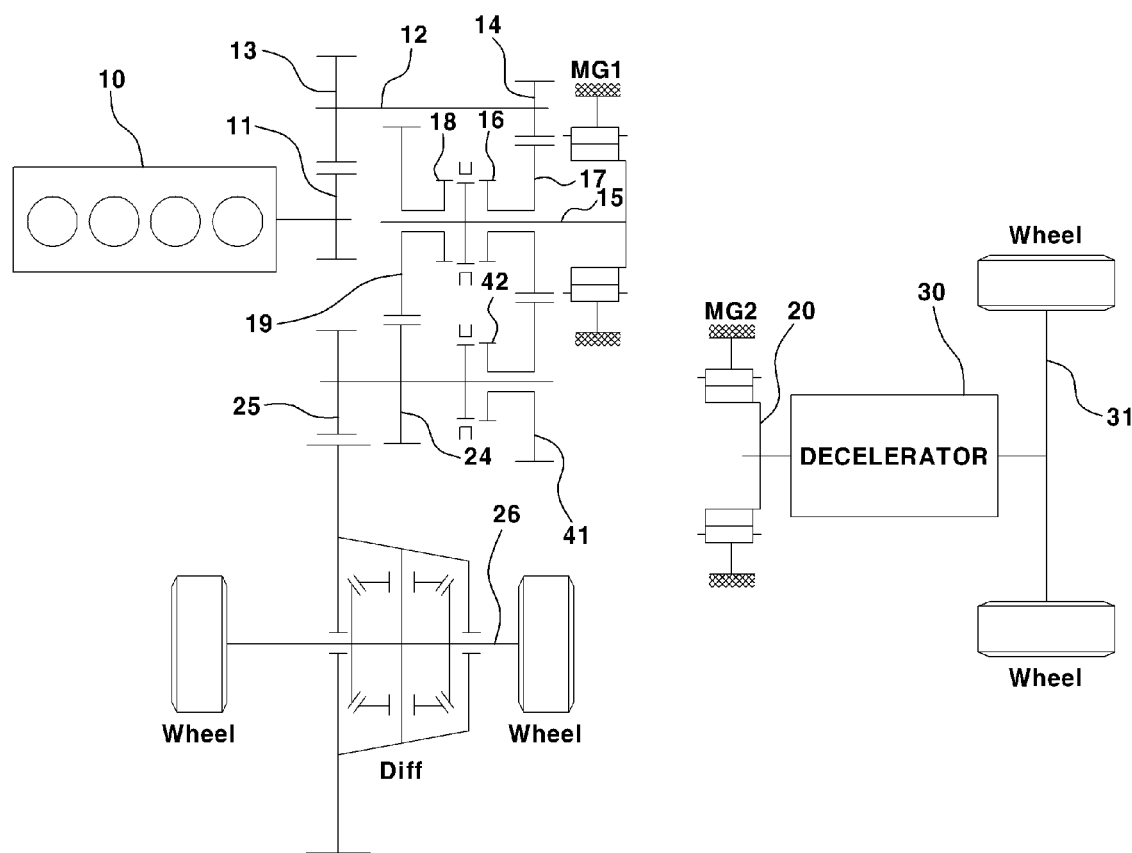
FIG. 11 is a power transmission system diagram showing a powertrain for an eco-friendly vehicle according to a fourth embodiment.

FIG. 11 is a power transmission system diagram showing a powertrain for an eco-friendly vehicle according to a fourth embodiment.

While the third embodiment is a 2WD powertrain for a vehicle, the fourth embodiment is a 4WD powertrain for a vehicle, as in the second embodiment.

In a second charge depletion mode, when the power of the first motor MG1, which is running power required to run the vehicle, is transmitted to the driving shaft 26 of the running wheels, if the running wheels which are driven by the power of the first motor MG1 are the rear wheels, the power of the second motor MG2 is transmitted to the front wheels through a decelerator 30. Accordingly, all of the front wheels and the rear wheels can be used as driving wheels.

On the other hand, the running wheels to which the power of the first motor MG1 is transmitted may be the front wheels, and the running wheels to which the power of the second motor MG2 is transmitted may be the rear wheels.

For the purpose of implementing 4WD operation, the rotating shaft 20 of the second motor MG2 is connected to a driving shaft 31 of the running wheels through the decelerator 30, as shown in FIG. 11.

Referring to FIG. 11, the second motor MG2 is not connected to the engine 10 and to the first motor MG1, but is connected to the driving shaft 31 of the other running wheels, which are not connected to the driving shaft 26, so as to transmit power to the driving shaft 31.

The fourth embodiment also employs the second motor MG2 as the main driving source for running the vehicle. Accordingly, in the first charge depletion mode, the second motor MG2 operates, and the power of the second motor MG2 is transmitted to the driving shaft 31 of the running wheels through the decelerator 30, thereby running the vehicle.

As shown in FIG. 11, the third embodiment and the fourth embodiment are similar except that the second motor MG2 is connected to the other running wheels, which are not connected to the first motor MG1, through the decelerator 30 so as to transmit power and that the third power transmission mechanism, which includes the first transmission gear 21 and the second transmission gear 22, is excluded because the rotating shaft 20 of the second motor MG2 is not connected to the second power transmission shaft 23 in a power transmittable manner.

Similar to the third embodiment, the fourth embodiment includes the parallel mode, compared to the first embodiment and the second embodiment. The power of the second motor MG2 for driving a vehicle in each of the first charge depletion mode, the second charge depletion mode, the charge sustaining mode, and the parallel mode is transmitted to the driving shaft 31 of the running wheels through the decelerator 30.

Although the power of the second motor MG2 is transmitted to the driving shaft 31 of the running wheels through the decelerator 30, there is no difference between the fourth embodiment and the third embodiment in the operational states of other components or flows of power transmission, and thus, only the parallel mode will be described, in order to avoid redundant descriptions.

Parallel Mode

The parallel mode is a running mode of a vehicle in which some of the power of the engine 10 supplements the output of the second motor MG2 such that some of the power of the engine 10 and the power of the second motor MG2 are used together to drive the vehicle.

In the parallel mode, the power of the engine 10 is divided into the power for electrical generation and the power for driving the running wheels so as to be used both in the electrical generation and the driving of the vehicle. Here, the first motor MG1 operates as a driving source for the generator using the some of the power of the engine 10 to charge the battery.

In the parallel mode, the power of the second motor MG2 is ultimately transmitted to the driving shaft 31 of the other running wheels, which are not connected to the driving shaft 26, through the decelerator 30.

In the parallel mode, some of the power of the engine 10 is transmitted to the first motor MG1 so as to be used as the power for electrical generation, and the remaining power of the engine 10 is transmitted to the driving shaft 26 of the running wheels through the fourth power transmission mechanism and the second power transmission shaft 23 of the second power transmission mechanism so as to be used as the auxiliary power for driving the vehicle. To this end, the first synchronizer 16 and the third synchronizer 42 are closed, whereas the second synchronizer 18 is opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16, and the rotating shaft 15 of the first motor MG1, and is then used in the electrical generation by the first motor MG1.

While the third synchronizer 42 is closed, the remaining power divided from the engine 10 (not the power transmitted to the first motor MG1 for electrical generation) is ultimately transmitted to the driving shaft 26 of the running wheels through the first motor power transmission gear 17, the fourth output gear 41, the third synchronizer 42, the second power transmission shaft 23 and the third output gear 25.

Fifth Embodiment

Figure 12:
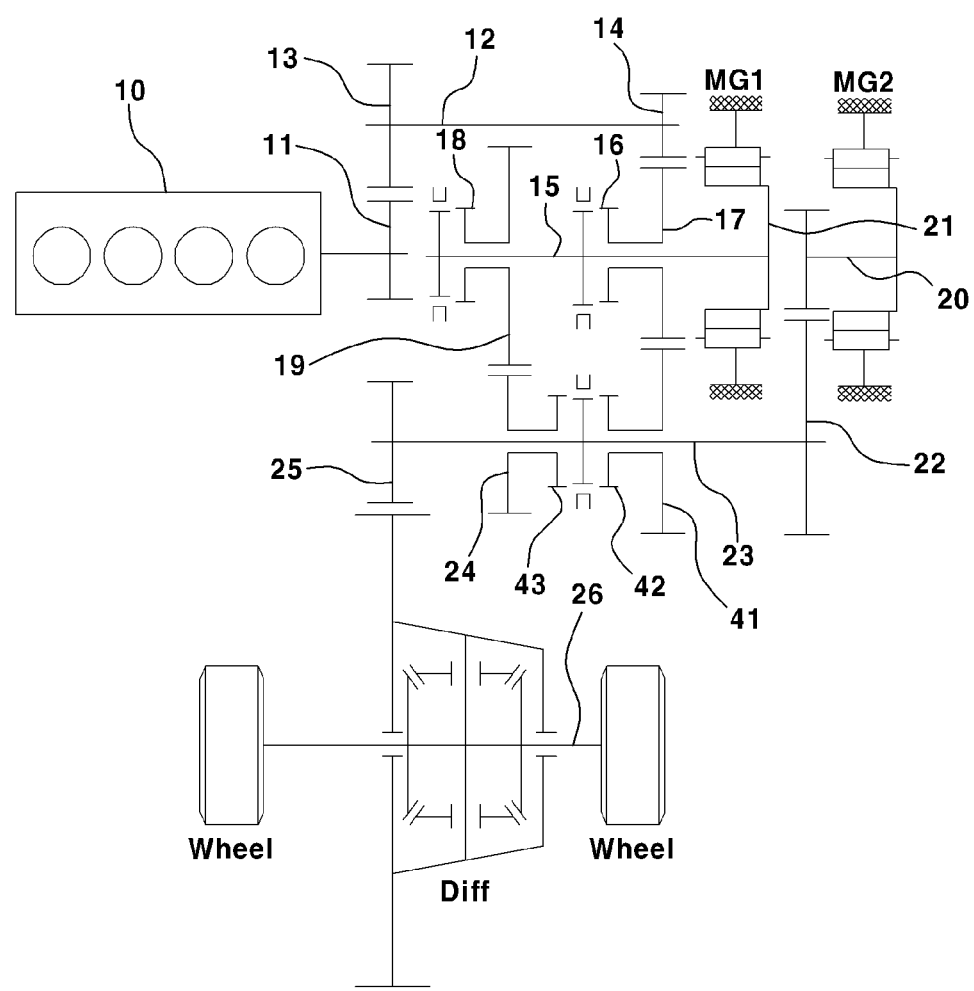
FIG. 12 is a power transmission system diagram showing a powertrain for an eco-friendly vehicle according to a fifth embodiment.

FIG. 12 is a power transmission system diagram showing a powertrain for an eco-friendly vehicle according to a fifth embodiment.

The fifth embodiment provides a powertrain including an engine 10 and two motors, which are, a first motor MG1 and a second motor MG2. The engine 10 provides power only for the generation of electrical power required to charge a battery (not shown), which is a energy storage device for the vehicle, or supplements the output of the second motor MG2 so as to serve as the driving source for running the vehicle.

When the power of the engine 10 is used to supplement the output of the second motor MG2, the power of the engine is divided into the power for electrical generation and the power for driving the running wheels to be used both in the electrical generation and the driving of the vehicle.

The first motor MG1 is driven as a generator using power transmitted from the engine 10 (charging by motor), or operates as a vehicular driving source to supplement the output of the second motor MG2 (driving as motor).

The second motor MG2 is the motor serving as the main driving source for driving a vehicle, that is, for outputting the power required for running the vehicle, and the power output from the second motor MG2 is ultimately transmitted to running wheels.

The powertrain according to the fifth embodiment has features that distinguish it from the third embodiment in that two paths, through which the remaining power divided from the engine 10 (not the power for electrical generation) is transmitted to the running wheels, are provided such that the divided power is ultimately transmitted to the running wheels through one selected from the two paths.

Accordingly, there are two parallel modes, which drive a vehicle through the divided power of the engine 10 and the power of the second motor MG2 through the two paths. Here, the two paths through which the divided power is transmitted have different gear ratios.

The powertrain according to the fifth embodiment further includes a fourth synchronizer 43 engaging or disengaging the transmission of power between the second output gear 24 and the second power transmission shaft 23, in addition to the components of the third embodiment.

The fourth synchronizer 43 is connected to the second power transmission shaft 23.

The second output gear 24 is connected to the second power transmission shaft 23 via the fourth synchronizer 43 and engaged with the first output gear 19, so that the transmission of power between the second output gear 24 and the second power transmission shaft 23 is selectively engaged or disengaged by the fourth synchronizer 43.

The second output gear 24 is coupled to the second power transmission shaft 23 in an idling manner. Upon closing of the fourth synchronizer 43, the second power transmission shaft 23 is integrated with the second output gear 24, thereby allowing the transmission of power therebetween.

Accordingly, there is no difference between the fifth embodiment and the third embodiment, with the exception that the transmission of power between the second output gear 24 and the second power transmission shaft 23 is engaged or disengaged by closing or opening of the fourth synchronizer 43.

Specifically, in the construction of the powertrain according to the fifth embodiment, the first power transmission mechanism is disposed between the engine 10 and the first motor MG1 so as to transmit the power of the engine 10 to the first motor MG1. Upon the operation of the first power transmission mechanism, the power of the engine 10 is transmitted to the first motor MG1.

The first power transmission mechanism includes: an engine gear 11 coupled to the output shaft of the engine 10; a first intermediate gear 13 coupled to a first power transmission shaft 12 and engaged with the engine gear 11; and a second intermediate gear 14 coupled to the first power transmission shaft 12, which is coaxial with the first intermediate gear 13. A first synchronizer 16 is connected to the rotating shaft 15 of the first motor MG1. A first motor power transmission gear 17 is connected to the rotating shaft 15 of the first motor MG1 via the first synchronizer 16 such that transmission of power between the first motor power transmission gear 17 and the rotating shaft 15 of the first motor MG1 is selectively engaged or disengaged by the first synchronizer 16, and engaged with the second intermediate gear 14.

The first motor power transmission gear 17 is coupled to the rotating shaft 15 of the first motor MG1 in the idling manner. Upon closing of the first synchronizer 16, the rotating shaft 15 of the first motor MG1 is integrated with the first motor power transmission gear 17, thereby enabling the transmission of power therebetween.

Upon closing of the first synchronizer 16, the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1, thereby causing the first motor MG1 to operate as a driving source for electrical generation.

The first synchronizer 16, which synchronizes the rotating shaft 15 of the first motor MG1 with the first motor power transmission gear 17, selectively engages or disengages the transmission of power between the rotating shaft 15 of the first motor MG1 and the first motor power transmission gear 17, and may include a general clutch.

The second power transmission mechanism for transmitting the power of the first motor MG1 to the driving shaft 26 of the running wheels is disposed between the first motor MG1 and the driving shaft 26 of the running wheels. By the operation of the second power transmission mechanism, the power of the first motor MG1 is transmitted to the running wheels.

The second power transmission mechanism includes: a second synchronizer 18 connected to the rotating shaft 15 of the first motor MG1; a first output gear 19 connected to the rotating shaft 15 of the first motor MG1 via the second synchronizer 18 such that the transmission of power between the first output gear 19 and the rotating shaft 15 of the first motor MG1 is selectively engaged or disengaged by the second synchronizer 18; and a second output gear 24 coupled to the second power transmission shaft 23 and engaged with the first output gear 19. A third output gear 25 is coupled to the second power transmission shaft 23, which is coaxial with the second output gear 24 and is connected to the driving shaft 26 of the running wheels so as to transmit the power to the driving shaft 26 of the running wheels.

The second synchronizer 18, which synchronizes the rotating shaft 15 of the first motor MG1 with the first output gear 19, selectively engages or disengages the transmission of power between the rotating shaft 15 of the first motor MG1 and the first output gear 19, and may include a general clutch.

The first output gear 19 is coupled to the rotating shaft 15 of the first motor MG1 in the idling manner. Upon closing of the second synchronizer 18, the rotating shaft 15 of the first motor MG1 is integrated with the first output gear 19, thereby enabling the transmission of power therebetween.

Accordingly, when the second synchronizer 18 is closed, the power of the first motor MG1 is transmitted to the driving shaft 26 of the running wheels through the rotating shaft 15 of the first motor MG1, the second synchronizer 18, the first output gear 19, the second output gear 24, the second power transmission shaft 23, and the third output gear 25.

The power, which is transmitted from the first motor MG1 in this way, may be used as an auxiliary power required for running a vehicle. That is, the power may supplement the power transmitted to the driving shaft 26 of the running wheels from the second motor MG2 so as to assist in driving a vehicle.

According to the fifth embodiment, the rotating shaft 20 of the second motor MG2 is connected to the second power transmission mechanism via the third power transmission mechanism so as to transmit the power to the second power transmission mechanism such that the second motor MG2 transmits the power to the running wheels, either in conjunction with or independently of the first motor MG1.

The third power transmission mechanism includes a first transmission gear 21 coupled to the rotating shaft 20 of the second motor MG2 and a second transmission gear 22, which is coupled to the second power transmission shaft 23 of the second power transmission mechanism so as to engage with the first transmission gear 21. The first transmission gear 21 is coaxially connected to the third output gear 25 of the second power transmission mechanism.

Accordingly, the power of the second motor MG2 is ultimately transmitted to the driving shaft 26 of the running wheels through the rotating shaft 20, the first transmission gear 21, the second transmission gear 22, the second power transmission shaft 23, and the third output gear 25.

The power of the second motor MG2, which is transmitted in this way, is used as the running power required for driving the vehicle.

The running wheels may be any pair of wheels selected from among the front and rear pairs of wheels. The fifth embodiment shown in FIG. 12 illustrates a two-wheel-drive (2WD) construction that employs the running wheels (front wheels or rear wheels) as the driving wheels.

The powertrain according to the fifth embodiment further includes a fourth power transmission mechanism, which is disposed between the first power transmission mechanism and the second power transmission mechanism so as to selectively transmit the remaining power divided from the engine 10 (not the power for electrical generation) to the second power transmission mechanism which is connected to the running wheels from the first power transmission mechanism.

The fourth power transmission mechanism includes a third synchronizer 42 selectively transmitting the remaining power divided from the engine 10 (not the power for electrical generation) to the second power transmission shaft 23 of the second power transmission mechanism from the first power transmission mechanism. The third synchronizer 42 is connected to the second power transmission shaft 23. The fourth power transmission mechanism further includes a fourth output gear 41 connected to the second power transmission shaft 23 via the third synchronizer 42 such that the transmission of power between the fourth output gear 41 and the second power transmission shaft 23 is selectively engaged or disengaged by the third synchronizer 42. The fourth output gear 41 is engaged with the first motor power transmission gear 17.

The fourth output gear 41 is coupled to the second power transmission 23 in an idling manner. When the third synchronizer 42 is closed, the fourth output gear 41 is integrated with the second power transmission shaft 23, thereby allowing the transmission of power therethrough.

When the first synchronizer 16 and the third synchronizer 42 are closed, the remaining power divided from the engine 10 (not the power transmitted to the first motor MG1 from the first power transmission mechanism for electrical generation) is ultimately transmitted to the driving shaft 26 of the running wheels through the first motor power transmission gear 17, the fourth output gear 41, the third synchronizer 42, the second power transmission shaft 23, and the third output gear 25.

According to the fifth embodiment of FIG. 12, the powertrain includes the first power transmission shaft 12, the rotating shaft 15 of the first motor MG1, and the second power transmission shaft 23, and further includes the first synchronizer 16, the second synchronizer 18, and the third synchronizer 42.

The first synchronizer 16 serves as an engine clutch adapted to engage or disengage the transmission of power between the engine 10 and the first motor MG1. The second synchronizer 18 engages or disengages the transmission of power to the running wheels from the first motor MG1 such that the power of the first motor MG1 and the power of the second motor MG2 are concurrently used as the running power for a vehicle (the power required for driving the vehicle).

In the double motor driving mode, the second power transmission shaft 23 serves as a final power transmission shaft, which receives both the power of the first motor MG1 and the power of the second motor MG2 and transmits the combined force to the driving shaft 26 of the running wheels through the third output gear 25.

The third synchronizer 42 engages or disengages the transmission of the remaining power which is divided from the engine 10 and transmitted to the running wheels (not the power transmitted to the first motor MG1 for electrical generation).

In the parallel mode operation, some of the power of the engine 10 supplements the power of the second motor MG2 such that both some of the power of the engine 10 and the power of the second motor MG2 are used to drive the vehicle.

According to the fifth embodiment, there are two power transmission paths, through which the remaining power which is divided from the engine 10 and transmitted to the running wheels (not the power for electrical generation), more specifically, the two power transmission paths through which the power divided from the engine 10 is transmitted to the second power transmission shaft 23 from the rotating shaft 15 of the first motor MG1. Therefore, either of the two parallel modes may operate depending on a change in a transmission path. One of the two power transmission paths includes the first output gear 19 and the second output gear 24 engaging with the first output gear 19, and the other includes the first motor power transmission gear 17 and the fourth output gear 41 engaging with the first motor power transmission gear 17. In order to have different gear ratios in the two power transmission paths, the gear ratio of the second output gear 24 to the first output gear 19 is controlled to be different from the gear ratio of the fourth output gear 41 to the first motor power transmission gear 17.

In the powertrain according to the fifth embodiment, the vehicle can run in one of the first charge depletion mode, the second charge depletion mode, the charge sustaining mode, the first parallel mode, and the second parallel mode.

Figure 13:
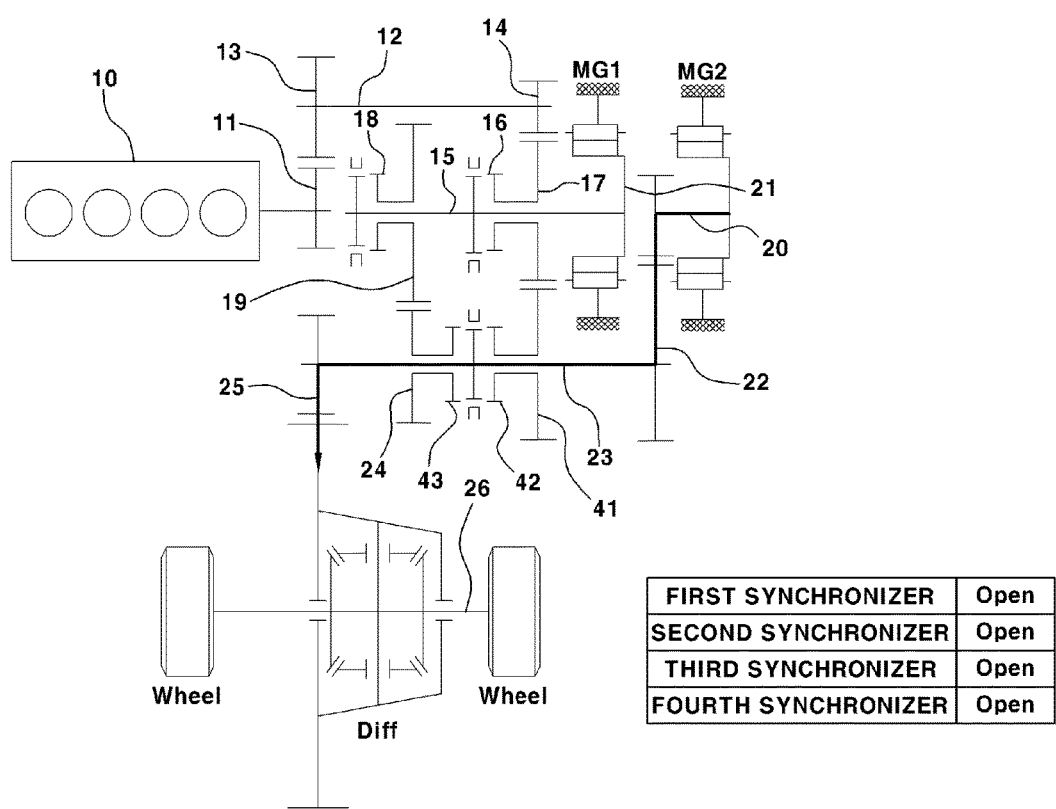
FIG. 13 illustrates the flow of power transmission in a first charge depletion (1st CD) mode of the powertrain according to the fifth embodiment.
Figure 14:
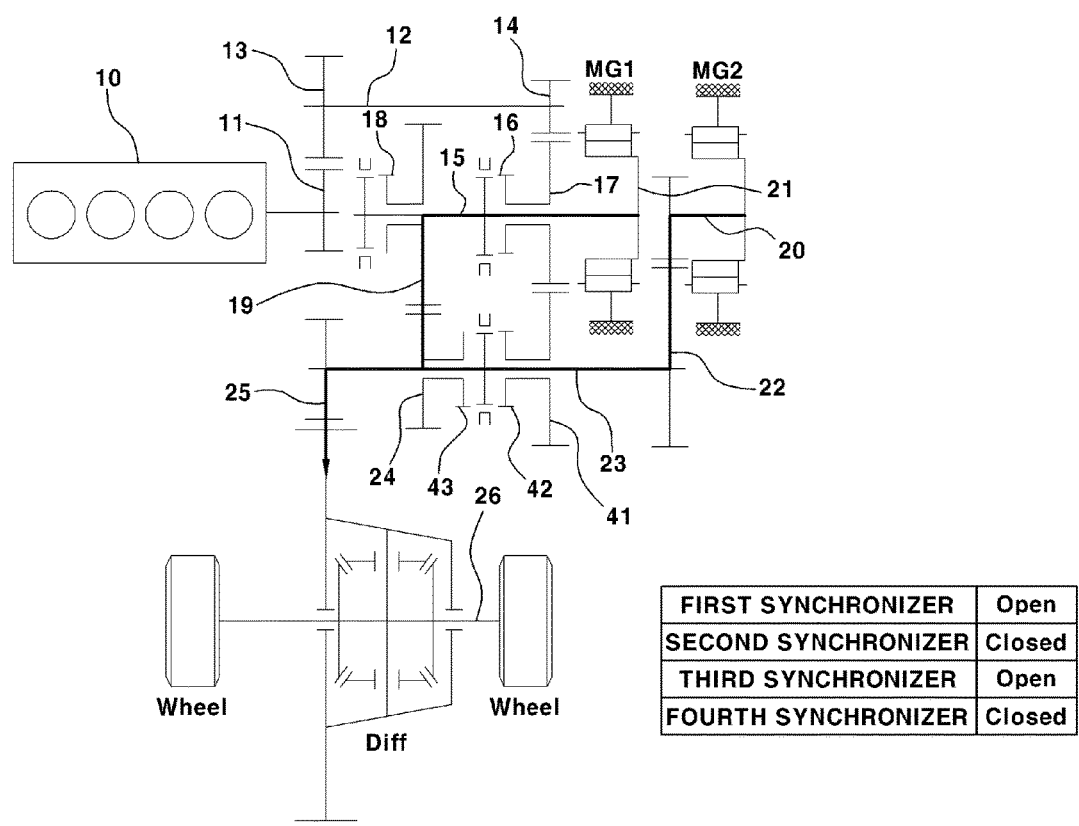
FIG. 14 illustrates the flow of power transmission in a second charge depletion (2nd CD) mode of the powertrain according to the fifth embodiment.
Figure 15:
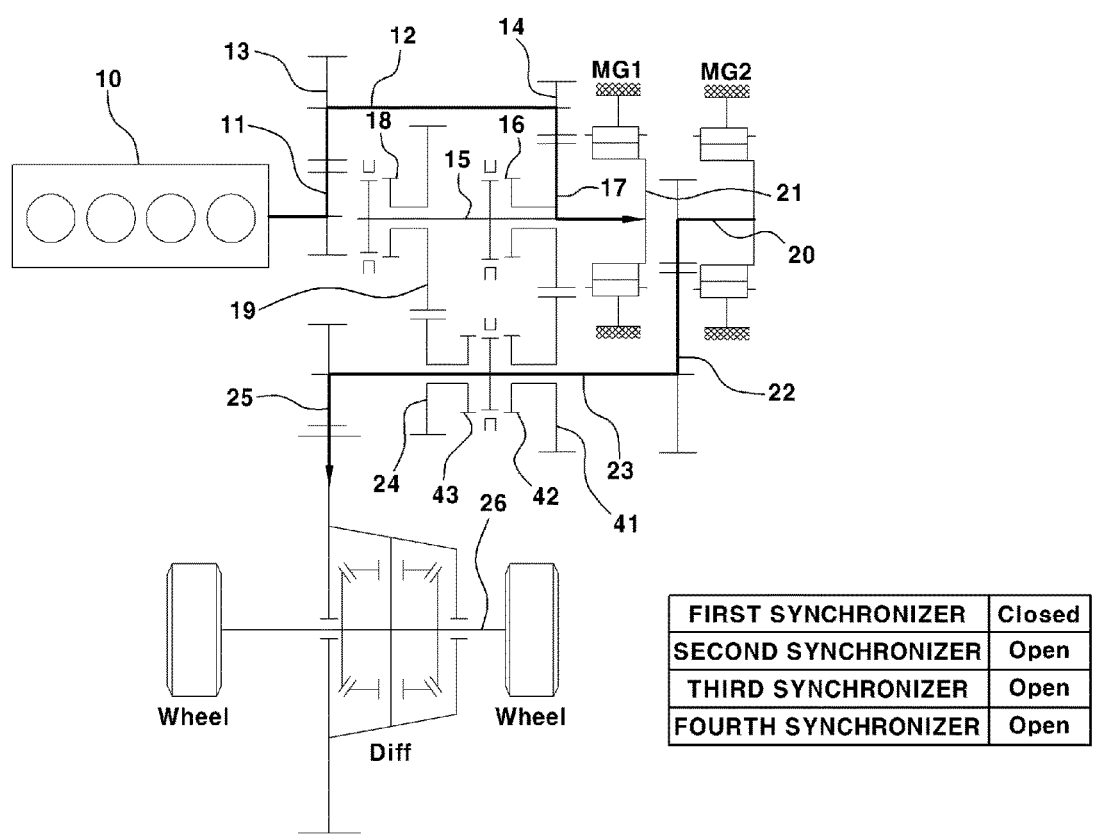
FIG. 15 illustrates the flow of power transmission in a charge sustaining (CS) mode of the powertrain according to the fifth embodiment.

Among these modes, since the first charge depletion mode, the second charge depletion mode and the charge sustaining mode do not have features that distinguish them from the first embodiment and the third embodiment in terms of the operational states of the components and the flows of power transmission, as shown in FIGS. 13 to 15, a detailed description thereof is omitted.

Figure 16:
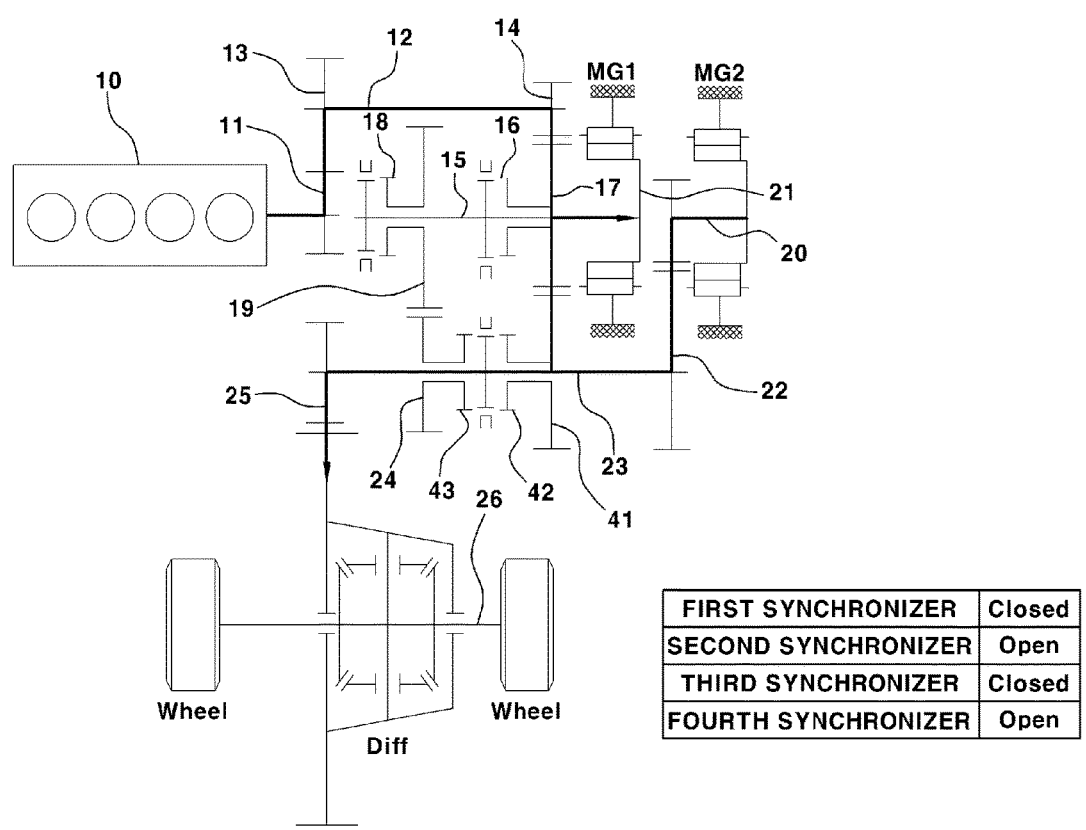
FIG. 16 illustrates the flow of power transmission in a first parallel mode of the powertrain according to the fifth embodiment.

Specifically, the first parallel mode does not have features that distinguish it from the parallel mode in the third embodiment in terms of the operational states of the components and the flows of power transmission, as shown in FIG. 16. The operational states and flows of power transmission in the first parallel mode and the second parallel mode will now be described.

Figure 17:
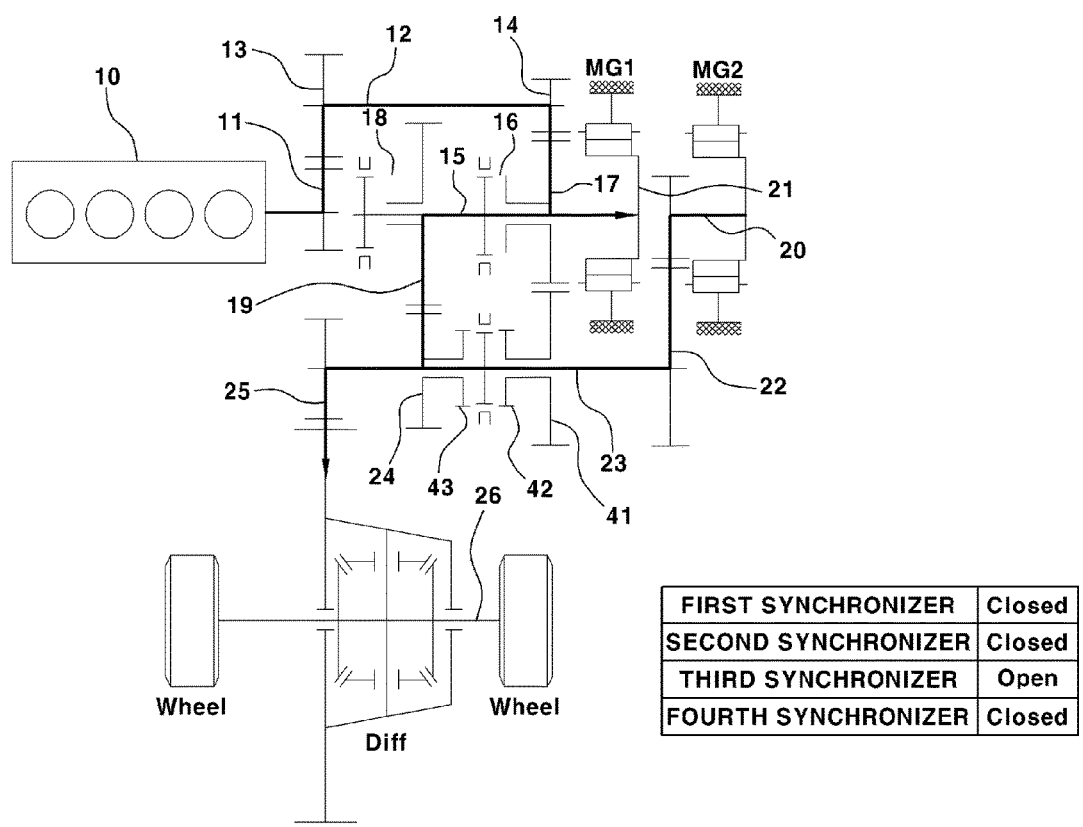
FIG. 17 illustrates the flow of power transmission in a second parallel mode of the powertrain according to the fifth embodiment.

FIG. 16 illustrates the flow of power transmission of the powertrain according to the fifth embodiment in the first parallel mode. FIG. 17 shows the flow of power transmission of the powertrain according to the fifth embodiment in the second parallel mode.

Each of the first parallel mode and the second parallel mode is a running mode of a vehicle in which some of the power of the engine 10 supplements the power of the second motor MG2 such that both some of the power of the engine 10 and the power of the second motor MG2 are used to drive the vehicle.

In the first and second parallel modes, the power of the engine 10 is divided into the power for electrical generation and the power for driving the running wheels so as to be used both in the electrical generation and the driving of the vehicle. Here, the first motor MG1 operates as the driving source for the generator using the some of the power of the engine 10 to charge the battery.

In the first and second parallel modes, the power of the second motor MG2 is ultimately transmitted to the running wheels through the third power transmission mechanism and the second power transmission shaft 23 of the second power transmission mechanism.

More specifically, in the first and second parallel modes, the power of the second motor MG2 is transmitted to the driving shaft 26 of the running wheels through the rotating shaft 20, the first transmission gear 21, the second transmission gear 22, the second power transmission shaft 23 and the third output gear 25.

First Parallel Mode

In the first parallel mode, during the transmission of power of the first power transmission mechanism for transmitting the power of the engine 10 to the first motor MG1, the disengagement of the transmission of power between the first motor MG1 and the driving shaft 26 of the running wheels by the second power transmission mechanism or the transmission of power by the fourth power transmission mechanism, the remaining power divided from the engine 10 (not the power transmitted to the first motor MG1 for electrical generation) is transmitted to the driving shaft 26 of the running wheels through the first power transmission mechanism, the fourth power transmission mechanism and the second power transmission mechanism so as to be used together with the power of the second motor MG2 to drive the vehicle.

The first parallel mode is described in more detail with reference to FIG. 16. Some of the power of the engine 10 is transmitted to the first motor MG1 so as to be used as the power for electrical generation, and the remaining power of the engine 10 is transmitted to the driving shaft 26 of the running wheels through the fourth power transmission mechanism and the second power transmission shaft 23 of the second power transmission mechanism so as to be used as the auxiliary power for driving the vehicle. Here, the first synchronizer 16 and the third synchronizer 42 are closed, whereas the second synchronizer 18 and the fourth synchronizer 43 are opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16, and the rotating shaft 15 of the first motor MG1, and is then used in the electrical generation by the first motor MG1.

While the third synchronizer 42 is closed, the remaining power divided from the engine 10 (not the power transmitted to the first motor MG1 for electrical generation) is ultimately transmitted to the driving shaft 26 of the running wheels through the first motor power transmission gear 17, the fourth output gear 41, the third synchronizer 42, the second power transmission shaft 23 and the third output gear 25.

Second Parallel Mode

In the second parallel mode, during the transmission of power of the first power transmission mechanism for transmitting the power of the engine 10 to the first motor MG1, the engagement of the transmission of power between the rotating shaft 15 of the first motor MG1 and the driving shaft 26 of the running wheels by the second power transmission mechanism, the disengagement of the transmission of power by the fourth power transmission mechanism, and the transmission of power by the fourth synchronizer 43, the remaining power divided from the engine 10 (not the power transmitted to the first motor MG 1 for electrical generation) is transmitted to the driving shaft 26 of the running wheels through the first power transmission mechanism, the fourth synchronizer 43 and the second power transmission mechanism so as to be used together with the power of the second motor MG2 to drive the vehicle.

The second parallel mode is described in more detail with reference to FIG. 17. Some of the power of the engine 10 is transmitted to the first motor MG1 so as to be used as the power for electrical generation, and the remaining power of the engine 10 is transmitted to the driving shaft 26 of the running wheels through the fourth synchronizer 43 and the second power transmission shaft 23 of the second power transmission mechanism so as to be used as the auxiliary power for driving the vehicle. The first synchronizer 16, the second synchronizer 18, and the fourth synchronizer 43 are closed, whereas the third synchronizer 42 is opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16, and the rotating shaft 15 of the first motor MG1, and is then used in the electrical generation by the first motor MG1.

While the second synchronizer 18 and the fourth synchronizer 43 are closed, the remaining power divided from the engine 10 (not the power transmitted to the first motor MG 1 for electrical generation) is ultimately transmitted to the driving shaft 26 of the running wheels through the rotating shaft 15 of the first motor MG1, the second synchronizer 18, the first output gear 19, the second output gear 24, the fourth synchronizer 43, the second power transmission shaft 23, and the third output gear 25.

Sixth Embodiment

Figure 18:
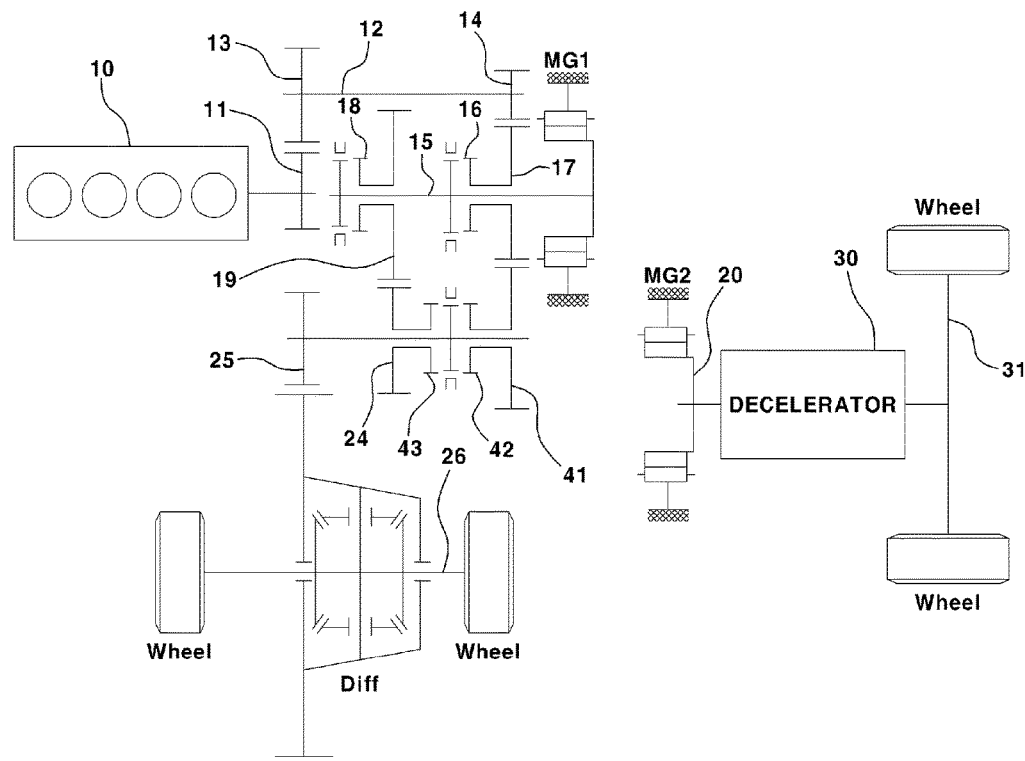
FIG. 18 is a power transmission system diagram showing a powertrain for an eco-friendly vehicle according to a sixth embodiment.

FIG. 18 is a power transmission system diagram showing a powertrain for an eco-friendly vehicle according to a sixth embodiment.

While the fifth embodiment is a 2WD powertrain for a vehicle, the sixth embodiment is a 4WD powertrain for a vehicle, as in the second embodiment and the fourth embodiment.

In a second charge depletion mode, when the power of the first motor MG1, which is running power required for driving a vehicle is transmitted to the driving shaft 26 of the running wheels, if the running wheels which are driven by the power of the first motor MG1 are the rear wheels, the power of the second motor MG2 is transmitted to the front wheels through a decelerator 30. Accordingly, all of the front wheels and the rear wheels can be used as driving wheels.

In some embodiments, the running wheels to which the power of the first motor MG1 is transmitted may be the front wheels, and the running wheels to which the power of the second motor MG2 is transmitted may be the rear wheels.

For the purpose of implementing 4WD operation, the rotating shaft 20 of the second motor MG2 is connected to a driving shaft 31 of the running wheels through the decelerator 30, as shown in FIG. 18.

Referring to FIG. 18, the second motor MG2 is not connected to the engine 10 and the first motor MG1, but is connected to the driving shaft 31 of the other running wheels, which are not connected to the driving shaft 26, so as to transmit power to the driving shaft 31.

The sixth embodiment employs the second motor MG2 as a main driving source for running the vehicle. Accordingly, in the first charge depletion mode, the second motor MG2 operates, and the power of the second motor MG2 is transmitted to the driving shaft 31 of the running wheels through the decelerator 30, thereby driving the vehicle.

As shown in FIG. 18, there is no difference between the fifth embodiment and the sixth embodiment except that the second motor MG2 is connected to the other running wheels, which are not connected to the first motor MG1, is connected. The third power transmission mechanism, which includes the first transmission gear 21 and the second transmission gear 22, is excluded because the rotating shaft 20 of the second motor MG2 is not connected to the second power transmission shaft 23 in a power transmittable manner.

Like the fifth embodiment, the sixth embodiment further includes the first and second parallel modes, compared to the first embodiment and the second embodiment. The power of the second motor MG2 for driving a vehicle in any one of the first charge depletion mode, the second charge depletion mode, the charge sustaining mode, the first parallel mode, and the second parallel mode is transmitted to the driving shaft 31 of the running wheels through the decelerator 30.

With the exception that the power of the second motor MG2 is transmitted to the driving shaft 31 of the running wheels through the decelerator 30, there is no difference between the sixth embodiment and the fifth embodiment in the operational states of other components and flows of power transmission, and thus, only the parallel mode will be described in order to avoid redundant descriptions.

Specifically, the first parallel mode does not have features that distinguish it from the parallel mode in the third embodiment in terms of the operational states of the components and flows of power transmission, as shown in FIG. 16. The operational states and flows of power transmission in the first parallel mode and the second parallel mode will now be described.

The first parallel mode and the second parallel mode are running modes of a vehicle in which some of the power of the engine 10 supplements the power of the second motor MG2 such that both some of the power of the engine 10 and the power of the second motor MG2 are used to drive the vehicle.

In the first and second parallel modes, the power of the engine 10 is divided into the power for electrical generation and the power for driving the running wheels so as to be used both in the electrical generation and the driving of the vehicle. Here, the first motor MG1 operates as the driving source for the generator using some of the power of the engine 10 to charge the battery.

In the first and second parallel modes, the power of the second motor MG2 is ultimately transmitted to the running wheels through the decelerator 30.

First Parallel Mode

The first parallel mode is a mode in which, during the transmission of power of the first power transmission mechanism for transmitting the power of the engine 10 to the first motor MG1, the disengagement of the transmission of power between the first motor MG1 and the driving shaft 26 of the running wheels by the second power transmission mechanism and the transmission of power by the fourth power transmission mechanism, the remaining power divided from the engine 10 (not the power transmitted to the first motor MG1 for electrical generation) is transmitted to the driving shaft 26 of the running wheels through the first power transmission mechanism, the fourth power transmission mechanism and the second power transmission mechanism so as to be used together with the power of the second motor MG2 (which is transmitted to the driving shaft corresponding to the other running wheels through the decelerator) to drive the vehicle.

More specifically, some of the power of the engine 10 is transmitted to the first motor MG1 so as to be used as the power for electrical generation, and the remaining power of the engine 10 is transmitted to the driving shaft 26 of the running wheels through the fourth power transmission mechanism and the second power transmission shaft 23 of the second power transmission mechanism so as to be used as the auxiliary power for driving the vehicle. Here, the first synchronizer 16 and the third synchronizer 42 are closed, whereas the second synchronizer 18 and the fourth synchronizer 43 are opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16 and the rotating shaft 15 of the first motor MG1, and is then used in the electrical generation by the first motor MG1.

While the third synchronizer 42 is closed, the remaining power divided from the engine 10 (not the power transmitted to the first motor MG1 for electrical generation) is ultimately transmitted to the driving shaft 26 of the running wheels through the first motor power transmission gear 17, the fourth output gear 41, the third synchronizer 42, the second power transmission shaft 23 and the third output gear 25.

Second Parallel Mode

In the second parallel mode, during the transmission of power of the first power transmission mechanism for transmitting the power of the engine 10 to the first motor MG1, engagement of the transmission of power is made between the rotating shaft 15 of the first motor MG1 and the driving shaft 26 of the running wheels by the second power transmission mechanism, and disengagement of the transmission of power of the fourth power transmission mechanism and the transmission of power of the fourth synchronizer 43 is made. Remaining power divided from the engine 10 (not the power transmitted to the first motor MG 1 for electrical generation) is transmitted to the driving shaft 26 of the running wheels through the first power transmission mechanism, the fourth synchronizer 43, and the second power transmission mechanism so as to be used together with the power of the second motor MG2 (which is transmitted to the driving shaft corresponding to the other running wheels through the decelerator) to drive the vehicle.

More specifically, some of the power of the engine 10 is transmitted to the first motor MG1 so as to be used as the power for electrical generation, and the remaining power of the engine 10 is transmitted to the driving shaft 26 of the running wheels through the fourth synchronizer 43 and the second power transmission shaft 23 of the second power transmission mechanism so as to be used as the auxiliary power for driving the vehicle. Here, the first synchronizer 16, the second synchronizer 18 and the fourth synchronizer 43 are closed, whereas the third synchronizer 42 is opened.

By closing the first synchronizer 16, some of the power of the engine 10 is transmitted to the first motor MG1 through the engine gear 11, the first intermediate gear 13, the first power transmission shaft 12, the second intermediate gear 14, the first motor power transmission gear 17, the first synchronizer 16, and the rotating shaft 15 of the first motor MG1, and is then used in the electrical generation by the first motor MG1.

While the second synchronizer 18 and the fourth synchronizer 43 are closed, the remaining power divided from the engine 10 (not the power transmitted to the first motor MG 1 for electrical generation) is ultimately transmitted to the driving shaft 26 of the running wheels through the rotating shaft 15 of the first motor MG1, the second synchronizer 18, the first output gear 19, the second output gear 24, the fourth synchronizer 43, the second power transmission shaft 23, and the third output gear 25.

As described above, the present disclosure offers the following advantages.

When a vehicle runs in a charge depletion mode in a state in which an SOC of the battery is at a reference value or higher, the power of the first motor in addition to the power of the second motor for driving the vehicle is transmitted to the running wheels, and accordingly the required power for the second motor for driving the vehicle can be reduced, thereby reducing manufacturing costs.

Even though the required power for the second motor is reduced, the power of the first motor for electrical generation in addition to the power of the second motor for driving the vehicle is transmitted to the running wheels. Accordingly, it is possible to maintain the total power in the charge depletion mode at a desired level, set before the required power for the second motor is reduced.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A powertrain for an eco-friendly vehicle comprising:
   an engine;
   a first motor for driving of a vehicle or receiving power from the engine to operate as a generator;
   a first power transmission mechanism disposed between the engine and the first motor to transmit engine power to the first motor or to cut off the power transmission between the engine and the first motor;
   a second power transmission mechanism disposed between the first motor and a driving shaft of running wheels to transmit power from the first motor to the driving shaft of the running wheels or to cut off the power transmission between the first motor and the driving shaft of the vehicle wheels; and
   a second motor connected to the second power transmission mechanism via a third power transmission mechanism to transmit power to the second power transmission mechanism, the second motor outputting power for driving the vehicle and transmitting power to the driving shaft of the running wheels through the third power transmission mechanism and the second power transmission mechanism,
   wherein a first charge depletion mode is implemented in which only power of the second motor is transmitted to the driving shaft of the running wheels through the third power transmission mechanism and the second power transmission mechanism during disengagement of the power transmission between the engine and the first motor by the first power transmission mechanism and during disengagement of the power transmission between the first motor and the driving shaft of the running wheels by the second power transmission mechanism.

2. The powertrain according to claim 1, wherein the first power transmission mechanism comprises:
   an engine gear coupled to an output shaft of the engine;
   a first intermediate gear coupled to a first power transmission shaft and engaged with the engine gear;
   a second intermediate gear coupled to the first power transmission shaft which is coaxial with the first intermediate gear;
   a first synchronizer connected to a rotating shaft of the first motor; and
   a first motor power transmission gear connected to the rotating shaft of the first motor via the first synchronizer such that transmission of power between the first motor power transmission gear and the rotating shaft of the first motor is selectively engaged or disengaged by the first synchronizer, the first motor power transmission gear being engaged with the second intermediate gear.

3. The powertrain according to claim 1, wherein the second power transmission mechanism comprises:
   a second synchronizer connected to the rotating shaft of the first motor;
   a first output gear connected to the rotating shaft of the first motor via the second synchronizer such that transmission of power between the first output gear and the rotating shaft of the first motor is selectively engaged or disengaged by the second synchronizer;
   a second output gear coupled to a second power transmission shaft and engaged with the first output gear; and
   a third output gear coupled to the second power transmission shaft that is coaxial with the second output gear and connected to the driving shaft of the running wheels in a power transmittable manner.

4. The powertrain according to claim 3, wherein the third power transmission mechanism comprises:
   a first transmission gear coupled to a rotating shaft of the second motor; and
   a second transmission gear coupled to the second power transmission shaft to be axial with the third output gear and engaged with the first transmission gear.

5. The powertrain according to claim 1, wherein a second charge depletion mode is implemented in which power of the first motor is transmitted to the driving shaft of the running wheels through the second power transmission mechanism and power of the second motor is transmitted to the driving shaft of the running wheels through the third power transmission mechanism and the second power transmission mechanism during disengagement of the power transmission between the engine and the first motor by the first power transmission mechanism and during the power transmission of the second power transmission mechanism for transmitting power of the first motor to the driving shaft of the running wheels.

6. The powertrain according to claim 1, wherein a charge sustaining mode is implemented in which power of the engine is transmitted to the first motor through the first power transmission mechanism for electrical generation and power of the second motor is transmitted to the driving shaft of the running wheels through the third power transmission mechanism and the second power transmission mechanism during power transmission of the first power transmission mechanism for transmitting power of the engine to the first motor and during disengagement of transmission of power between the first motor and the driving shaft of the running wheels by the second power transmission mechanism.

7. The powertrain according to claim 1, further comprising a fourth power transmission mechanism, which is disposed between the first power transmission mechanism and the second power transmission mechanism to selectively transmit the remaining power divided from the engine to the second power transmission mechanism, which is connected to the driving shaft of the running wheels, from the first power transmission mechanism.

8. The powertrain according to claim 7, wherein the fourth power transmission mechanism comprises:
   a third synchronizer connected to the second power transmission shaft which transmits power to the driving shaft of the running wheels from the second power transmission mechanism; and
   a fourth output gear connected to the second power transmission shaft via the third synchronizer such that transmission of power between the fourth output gear and the second power transmission shaft is selectively engaged or disengaged by the third synchronizer, the fourth output gear being engaged with the first motor power transmission gear which transmits power of the engine from the first power transmission mechanism.

9. The powertrain according to claim 7, wherein a parallel mode is implemented in which the remaining power divided from the engine is transmitted to the driving shaft of the running wheels through the first power transmission mechanism, the fourth power transmission mechanism, and the second power transmission mechanism to be used together with power of the second motor to drive the vehicle during power transmission of the first power transmission mechanism for transmitting power of the engine to the first motor and during disengagement of transmission of power between the first motor and the driving shaft of the running wheels by the second power transmission mechanism and power transmission of the fourth power transmission mechanism.

10. The powertrain according to claim 7, wherein the second power transmission mechanism comprises:
    a second synchronizer connected to a rotating shaft of the first motor;
    a first output gear connected to the rotating shaft of the first motor via the second synchronizer such that transmission of power between the first output gear and the rotating shaft of the first motor is selectively engaged or disengaged by the second synchronizer;
    a second output gear coupled to the second power transmission shaft and engaged with the first output gear; and
    a third output gear coupled to the second power transmission shaft, which is coaxial with the second output gear, and connected to the driving shaft of the running wheels in a power transmittable manner,
    wherein the powertrain further comprises a fourth synchronizer connected to the second power transmission shaft to engage or disengage transmission of power between the second output gear and the second power transmission shaft.

11. The powertrain according to claim 8, wherein the second power transmission mechanism comprises:
    a second synchronizer connected to a rotating shaft of the first motor;
    a first output gear connected to the rotating shaft of the first motor via the second synchronizer such that transmission of power between the first output gear and the rotating shaft of the first motor is selectively engaged or disengaged by the second synchronizer;

a second output gear coupled to the second power transmission shaft and engaged with the first output gear; and a third output gear coupled to the second power transmission shaft, which is coaxial with the second output gear, and connected to the driving shaft of the running wheels to transmit power to the driving shaft of the running wheels, wherein the powertrain further comprises a fourth synchronizer connected to the second power transmission shaft such that the power transmission between the second output gear and the second power transmission shaft is engaged or disengaged, and wherein a gear ratio of the second output gear to the first output gear is different from a gear ratio of the fourth output gear to the first motor power transmission gear.

12. The powertrain according to claim 10, wherein a parallel mode is implemented in which the remaining power divided from the engine is transmitted to the driving shaft of the running wheels through the first power transmission mechanism, the fourth synchronizer, and the second power transmission mechanism to be used together with power of the second motor to drive the vehicle during power transmission of the first power transmission mechanism for transmitting power of the engine to the first motor, during the power transmission of the second power transmission mechanism for engaging transmission of power between the rotating shaft of the first motor and the driving shaft of the running wheels, and during disengagement of power transmission of the fourth power transmission mechanism and power transmission of the fourth synchronizer.

* * * * *